United States Patent
Shinozaki et al.

(10) Patent No.: US 9,179,038 B2
(45) Date of Patent: Nov. 3, 2015

(54) IMAGE PROCESSING DEVICE, AND IMAGE PROCESSING METHOD AND PROGRAM

(75) Inventors: Hirotaka Shinozaki, Tokyo (JP); Fumihito Yasuma, Tokyo (JP)

(73) Assignee: Sony Corporation, Tokyo (JP)

( * ) Notice: Subject to any disclaimer, the term of this patent is extended or adjusted under 35 U.S.C. 154(b) by 465 days.

(21) Appl. No.: 13/426,535

(22) Filed: Mar. 21, 2012

(65) Prior Publication Data
US 2012/0250994 A1   Oct. 4, 2012

(30) Foreign Application Priority Data

Mar. 30, 2011 (JP) ................... 2011-076186
Jan. 10, 2012 (JP) ................... 2012-002608

(51) Int. Cl.
G06K 9/00 (2006.01)
H04N 1/401 (2006.01)
H04N 1/58 (2006.01)
G06T 5/00 (2006.01)
G06T 5/20 (2006.01)

(52) U.S. Cl.
CPC ............. *H04N 1/401* (2013.01); *G06T 5/005* (2013.01); *G06T 5/20* (2013.01); *H04N 1/58* (2013.01); *G06T 2207/10024* (2013.01)

(58) Field of Classification Search
USPC .......................................... 382/108
See application file for complete search history.

(56) References Cited

U.S. PATENT DOCUMENTS

| | | | |
|---|---|---|---|
| 6,751,339 B1 * | 6/2004 | Windle et al. | 382/108 |
| 2006/0140497 A1 * | 6/2006 | Kondo et al. | 382/254 |
| 2006/0290794 A1 * | 12/2006 | Bergman et al. | 348/246 |
| 2008/0170801 A1 * | 7/2008 | Kozlov et al. | 382/275 |

FOREIGN PATENT DOCUMENTS

JP   2008-154276   7/2008
JP   2010-130238   6/2010

* cited by examiner

*Primary Examiner* — Alex Liew
(74) *Attorney, Agent, or Firm* — Paratus Law Group, PLLC

(57) ABSTRACT

Disclosed is an image processing device which is provided with a determination section which determines texture direction in a vicinity region based on the vicinity region which includes a target pixel in the image and a detection section which detects whether or not the target pixel is a defective pixel based on a plurality of pixels including the target pixel which are lined up in the texture direction in the image.

6 Claims, 28 Drawing Sheets

$L_1 = G_{37} - 2 \cdot G_{46} + G_{55}$
$L_2 = G_{46} - 2 \cdot G_{55} + G_{64}$
$L_3 = G_{55} - 2 \cdot G_{64} + G_{73}$ FIG. 11
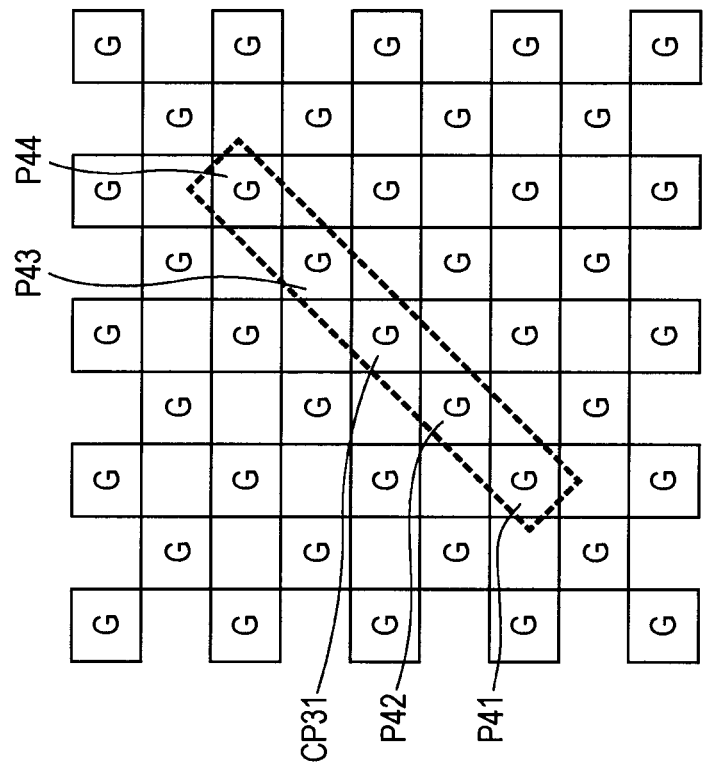
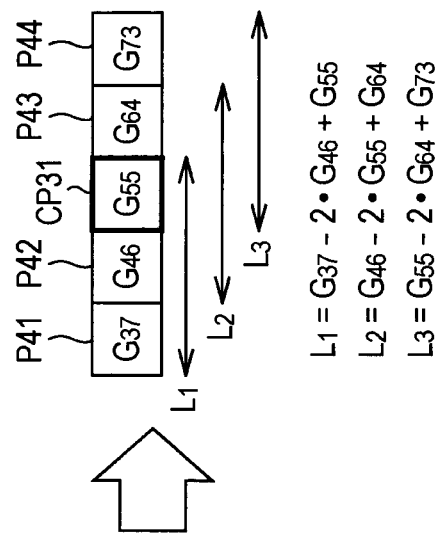
$L_1 = G_{37} - 2 \cdot G_{46} + G_{55}$
$L_2 = G_{46} - 2 \cdot G_{55} + G_{64}$
$L_3 = G_{55} - 2 \cdot G_{64} + G_{73}$

FIG. 15

| W | G | W | G | W | G | W | G | W |
|---|---|---|---|---|---|---|---|---|
| R | W | B | W | R | W | B | W | R |
| W | G | W | G | W | G | W | G | W |
| B | W | R | W | B | W | R | W | B |
| W | G | W | G | W | G | W | G | W |
| R | W | B | W | R | W | B | W | R |
| W | G | W | G | W | G | W | G | W |
| B | W | R | W | B | W | R | W | B |
| W | G | W | G | W | G | W | G | W |

FIG. 16

| Gr | R | Gr | R | Gr | R | Gr | R | Gr |
|----|---|----|---|----|---|----|---|----|
| B | Gb | B | Gb | B | Gb | B | Gb | B |
| Gr | R | Gr | R | Gr | R | Gr | R | Gr |
| B | Gb | B | Gb | B | Gb | B | Gb | B |
| Gr | R | Gr | R | Gr | R | Gr | R | Gr |
| B | Gb | B | Gb | B | Gb | B | Gb | B |
| Gr | R | Gr | R | Gr | R | Gr | R | Gr |
| B | Gb | B | Gb | B | Gb | B | Gb | B |
| Gr | R | Gr | R | Gr | R | Gr | R | Gr |

FIG. 19

| R | G | R | G | R | G | R | G | R |
|---|---|---|---|---|---|---|---|---|
| G | B | G | B | G | B | G | B | G |
| R | G | R | G | R | G | R | G | R |
| G | B | G | B | G | B | G | B | G |
| R | G | R | G | R' | G | R | G | R |
| G | B | G | B | G | B | G | B | G |
| R | G | R | G | R | G | R | G | R |
| G | B | G | B | G | B | G | B | G |
| R | G | R | G | R | G | R | G | R |

|   | B |   | B |   |
|---|---|---|---|---|
| R |   | R |   | R |
|   | B | G | B |   |
| R |   | R |   | R |
|   | B |   | B |   |

| W | G | W | G | W | G | W | G | W |
|---|---|---|---|---|---|---|---|---|
| R | W | B | W | R | W | B | W | R |
| W | G | W | G | W | G | W | G | W |
| B | W | R | W | B | W | R | W | B |
| W | G | W | G | W | G | W | G | W |
| R | W | B | W | R | W | B | W | R |
| W | G | W | G | W | G | W | G | W |
| B | W | R | W | B | W | R | W | B |
| W | G | W | G | W | G | W | G | W |

IMAGE PROCESSING DEVICE, AND IMAGE PROCESSING METHOD AND PROGRAM

BACKGROUND

The present technology relates to an image processing device, and an image processing method and a program, and in particular, to an image processing device, and an image processing method and a program which are able to more simply detect a defective pixel with a higher degree of accuracy.

From the past, there is a technique where a defective pixel is detected in an image and the defective pixel which has been detected is corrected. A defective pixel refers to a pixel, out of the pixels in an image, which does not have a value which is originally to be taken as a pixel value and the defective pixel is often a pixel which is white or black.

As a technique for correcting a defective pixel such as this, a technique is proposed where an edge direction of an object is detected, the defective pixel is detected based on the edge direction, and the defective pixel which has been detected is corrected (for example, refer to Japanese Unexamined Patent Application Publication No. 2008-154276).

In addition, a technique is also proposed where, in a case where defective pixels of the same color are lined up to be continuous, these defective pixels (referred to below as continuous defective pixels) are detected and corrected (for example, refer to Japanese Unexamined Patent Application Publication No. 2010-130238).

SUMMARY

However, in the techniques described above, the defective pixel is not able to be detected simply and with a high degree of accuracy. For example, in the method where the defective pixel is detected based on the edge direction, continuous defective pixels are not able to be detected.

In addition, in the technique where continuous defective pixels are detected, it is necessary for a determination section for detecting the continuous defective pixels and a determination section for detecting so-called single defective pixels, where the pixel itself which is a processing target is defective but the pixels which are adjacent in the vicinity thereof are not defective, to be separately provided.

It is desirable to be able to more simply detect a defective pixel with a higher degree of accuracy.

According to a first embodiment of the present technology, there is provided an image processing device which is provided with a determination section which determines texture direction in a vicinity region based on the vicinity region which includes a target pixel in the image and a detection section which detects whether or not the target pixel is a defective pixel based on a plurality of pixels including the target pixel which are lined up in the texture direction in the image.

It is possible for a secondary differential value calculation section, which calculates a secondary differential value of the pixel value of the pixel with regard to a grouping of a predetermined number of pixels including the target pixel which are lined up to be continuous in the texture direction, and a comparator, which determines whether the target pixel is a defective pixel based on the secondary differential values of a plurality of the groupings which are different, to be provided in the detection section.

It is possible to determine that the target pixel is a defective pixel in the comparator in a case where each secondary differential value of the plurality of the groupings which are different is larger than a predetermined threshold.

It is possible for a defective pixel correction section, which corrects the target pixel based on the pixels in the vicinity of the target pixel which are the same color as the target pixel and are lined up in the texture direction, to be further provided in the image processing device.

It is possible for a differential value calculation section, which calculates differential values for two pixels which are adjacent in a first direction which is parallel to the texture direction with regard to the target pixel and differential values for two pixels which are adjacent in a second direction which is opposite to the first direction with regard to the target pixel, and a correction value calculation section which sets a target pixel after correction by carrying out a weighted average for two pixels which are adjacent in a direction where the differential value is smaller out of the first direction and the second direction with regard to the target pixel, to be provided in the defective pixel correction section.

It is possible for the differential value of a direction in the vicinity region to be calculated based on the differential value between the pixels which are lined up in the same direction in the vicinity region and the direction where the differential value is the smallest out of a plurality of directions is set as the texture direction in the determination section.

According to the first embodiment of the present technology, there is provided an image processing method and a program including determining the texture direction in the vicinity region based on the vicinity region which includes the target pixel in the image and detecting whether the target pixel is a defective pixel based on the plurality of pixels including the target pixel which are lined up in the texture direction in the image.

In the first embodiment of the present technology, the texture direction in the vicinity region is determined based on the vicinity region which includes the target pixel in the image and whether the target pixel is a defective pixel is detected based on the plurality of pixels including the target pixel which are lined up in the texture direction in the image.

According to a second embodiment of the present technology, there is provided an image processing device which is provided with a correction section which corrects a target pixel based on pixels in a region which includes the target pixel in the image with regard to an image where each pixel has any of a plurality of color components as a pixel value and an erroneous correction determination section which performs erroneous correction determination with regard to the target pixel based on the pixels in a vicinity region which includes the target pixel in the image, the target pixel, and the corrected target pixel which is acquired by the correction with regard to the target pixel.

It is possible to perform the erroneous correction determination in the erroneous correction determination section based on at least the pixels in the vicinity of the target pixel which have a color component which is different to the target pixel, the target pixel, and the corrected target pixel.

It is possible for a white balance calculation section which calculates a fraction of the average value of the pixels with the same color as the target pixel in the vicinity region and the average value of the pixels with a color difference different to the target pixel in the vicinity region as white balance and an achromatic colorization average value calculation section which calculates an achromatic colorization average value by multiplying the average value of the pixels with a color different from the target pixel which are positioned in the vicinity of the target pixel with the white balance, to be further provided in the imaging processing device, and it is possible for erroneous correction determination to be performed in the erroneous correction determination section by comparing the achromatic colorization average value, the target pixel, and the corrected target pixel.

It is possible to output the target pixel as the final target pixel in the erroneous correction determination section in a case where the absolute difference value of the achromatic colorization average value and the target pixel is equal to or less than the absolute difference value of the achromatic colorization average value and the corrected target pixel.

It is possible to output the corrected target pixel as the final target pixel in the erroneous correction determination section in a case where the absolute difference value of the achromatic colorization average value and the target pixel is larger than the absolute difference value of the achromatic colorization average value and the corrected target pixel.

It is possible for the target pixel to be corrected in the correction section by performing a defective pixel correction process or a noise removal process with regard to the target pixel.

According to the second embodiment of the present technology, there is provided an image processing method and a program including correcting a target pixel based on pixels in a region which includes the target pixel in the image with regard to an image where each pixel has any of a plurality of color components as a pixel value, and performing erroneous correction determination with regard to the target pixel based on the pixels in a vicinity region which includes the target pixel in the image, the target pixel, and the corrected target pixel which is acquired by the correction with regard to the target pixel.

In the second embodiment of the present technology, a target pixel is corrected based on pixels in a region which includes the target pixel in the image with regard to an image where each pixel has any of a plurality of color components as a pixel value, and erroneous correction determination is performed with regard to the target pixel based on the pixels in a vicinity region which includes the target pixel in the image, the target pixel, and the corrected target pixel which is acquired by the correction with regard to the target pixel.

According to the first embodiment and the second embodiment of the present technology, it is possible to more simply detect a defective pixel with a higher degree of accuracy.

BRIEF DESCRIPTION OF THE DRAWINGS

FIG. 11 is a diagram describing calculation of a secondary differential value;

FIG. 15 is a diagram illustrating an arrangement example of pixels in an image;

FIG. 16 is a diagram describing another specific method of the texture direction;

FIG. 19 is a diagram describing calculation of the average value of a target vicinity region;

FIG. 29 is a diagram describing calculation of an achromatic colorization average value;

FIG. 30 is a diagram illustrating an arrangement example of pixels in an image;

DETAILED DESCRIPTION OF EMBODIMENTS

Below, embodiments where the present technology is applied will be described with reference to the diagram.

First Embodiment

[Configuration Example of Image Processing Device]

Figure 1:
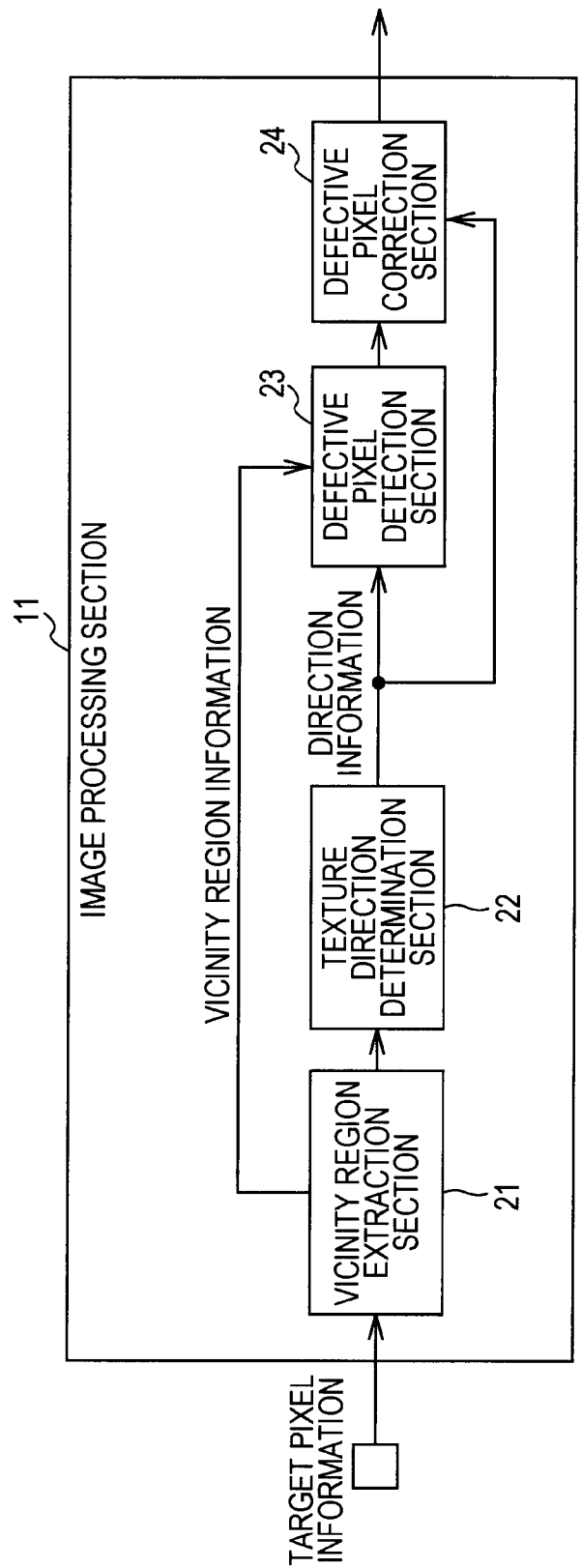
FIG. 1 is a diagram illustrating a configuration example of an image processing device according to an embodiment of the present technology.

FIG. 1 is a diagram illustrating a configuration example of an image processing device according to an embodiment where present technology is applied.

An image processing device 11 has target pixel information which includes the pixel values, the positions, color component information, or the like of the pixels which are in the vicinity of the pixel which is a target in the image (referred to below as a target pixel) as input, and outputs a target pixel where defects have been corrected as necessary.

The image processing section 11 is configured from a vicinity region extraction section 21, a texture direction determination section 22, a defective pixel detection section 23, and a defective pixel correction section 24.

For example, the target pixel information which is formed from the pixel values of a plurality of pixels in the vicinity of the target pixel, the position of each of the pixels, and color component information which indicates the color component of each of the pixels is supplied in the vicinity region extraction section 21. The vicinity region extraction section 21 extracts information on a vicinity region formed from several pixels in the vicinity of the target pixel in the image which includes the target pixel from the target pixel information which has been supplied and supplies the information to the texture direction determination section 22 and the defective pixel detection section 23.

The texture direction determination section 22 specifies the texture direction in the image based on the vicinity region information which is supplied from the vicinity region extraction section 21 and supplies the direction information which indicates the texture direction which has been specified to the defective pixel detection section 23 and the defective pixel correction section 24.

The defective pixel detection section 23 specifies whether or not the target pixel is a defective pixel based on the direction information which is supplied from the texture direction determination section 22 and the vicinity region information which is supplied from the vicinity region extraction section 21, and supplies the specification result and the pixels in the vicinity of the target pixel to the defective pixel correction section 24.

The defective pixel correction section 24 corrects the target pixel as necessary based on the specification result of whether or not the target pixel is a defective pixel and the pixels in the vicinity of the target pixel which are supplied from the defective pixel detection section 23 and the direction information from the texture direction determination section 22, and outputs the target pixel after correction.

[Configuration Example of Texture Direction Determination Section]

Figure 2:
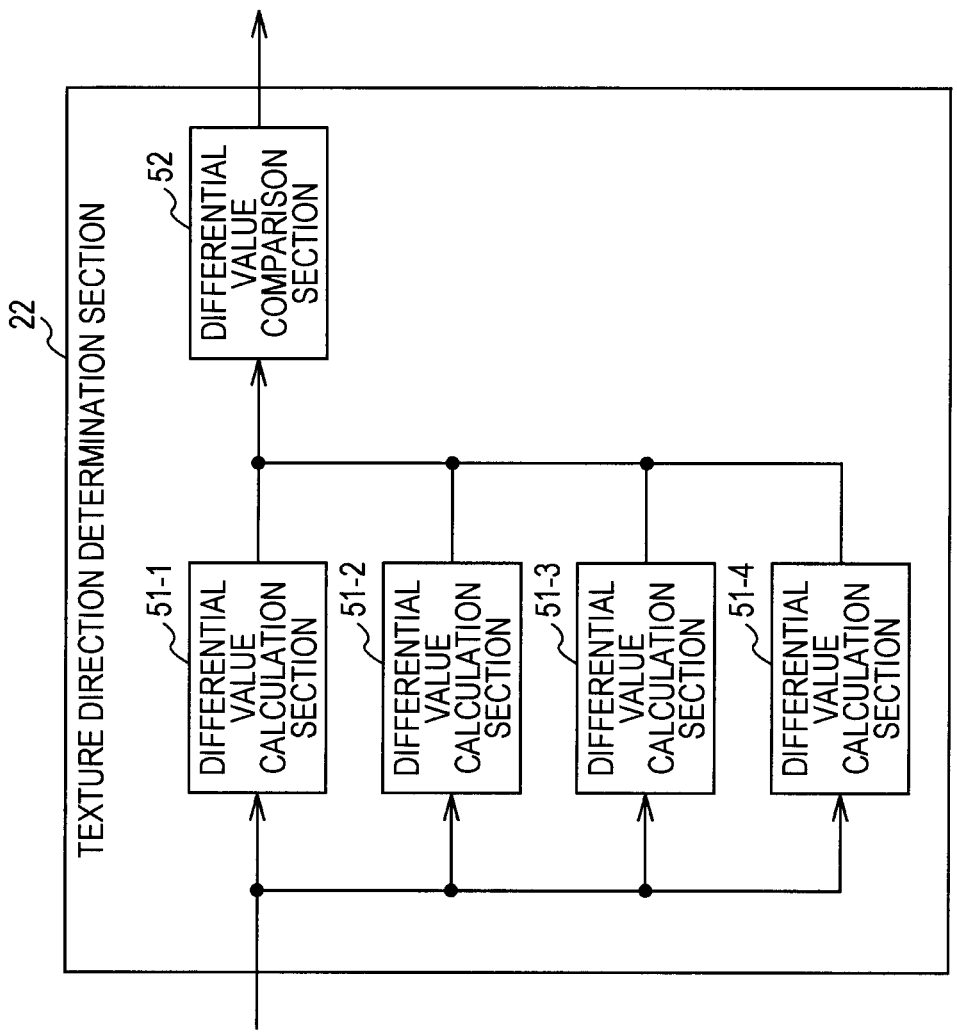
FIG. 2 is a diagram illustrating a configuration example of a texture direction determination section.

In addition, in more detail, the texture direction determination section 22 in FIG. 1 is configured as shown in FIG. 2.

That is, the texture direction determination section 22 is configured from a differential value calculation section 51-1 to a differential value calculation section 51-4 and a differential value comparison section 52.

The differential value calculation section 51-1 to the differential value calculation section 51-4 calculate a differential value for each direction in the region in the vicinity of the target pixel in the image based on the vicinity region information which is supplied from the vicinity region extraction section 21, and supplies the differential value to the differential value comparison section 52. Here, differential value calculation section 51-1 to the differential value calculation section 51-4 are simply referred to below as the differential value calculation section 51 in cases where particular determination is not necessary.

The differential value comparison section 52 specifies the texture direction by comparing the differential value for each direction which is supplied from the differential value calculation section 51, and supplies the direction information which indicates the texture direction which has been specified to the defective pixel detection section 23 and the defective pixel correction section 24. For example, the direction where the differential value is the smallest out of each of the directions is the texture direction.

[Configuration Example of Defective Pixel Detection Section]

Figure 3:
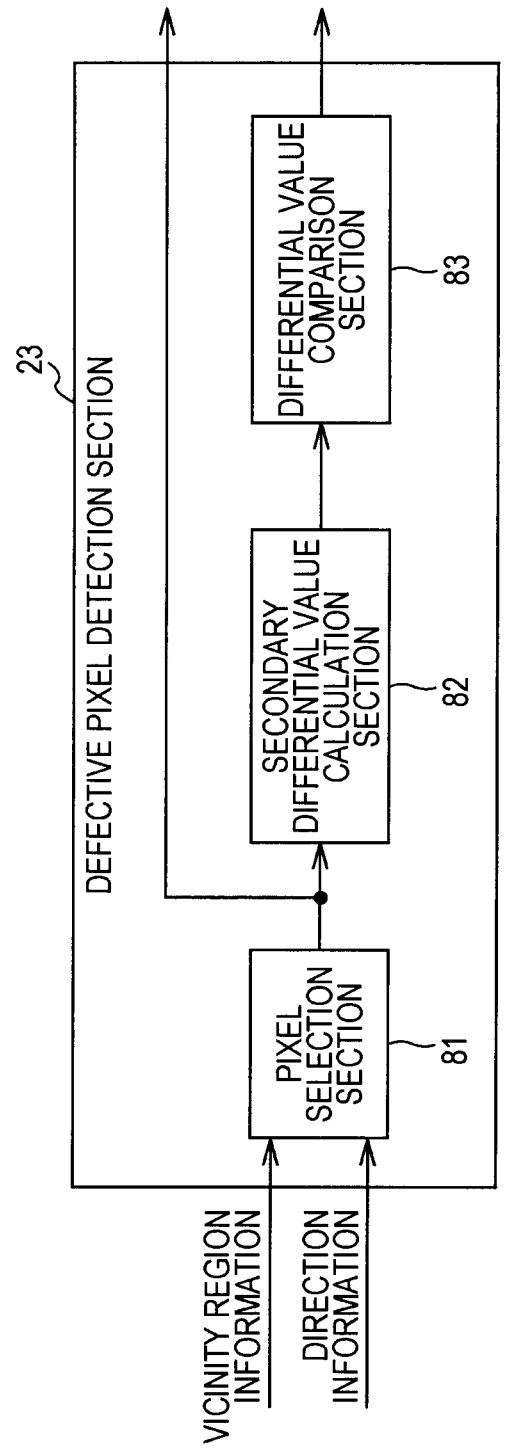
FIG. 3 is a diagram illustrating a configuration example of a defective pixel detection section.

Furthermore, in more detail, the defective pixel detection section 23 in FIG. 1 is configured as shown in FIG. 3.

That is, the defective pixel detection section 23 is configured from a pixel selection section 81, a secondary differential value calculation section 82, and a differential value comparison section 83.

The pixel selection section 81 selects several pixels including the target pixel which are lined up in the texture direction in the image based on the vicinity region information which is supplied from the vicinity region extraction section 21 and the direction information which is supplied from the differential value comparison section 52 of the texture direction determination section 22. The pixel selection section 81 supplies the pixels which have been selected (referred to below as selected pixels) to the secondary differential value calculation section 82 and the defective pixel correction section 24.

The secondary differential value calculation section 82 calculates a secondary differential value for each group of pixels including the target pixel which are lined up to be continuous based on the selected pixels which have been supplied from the pixel selection section 81, and supplies the secondary differential value to the differential value comparison section 83. The differential value comparison section 83 specifies whether the target pixel is a defective pixel based on the plurality of secondary differential values which have been supplied from the secondary differential value calculation section 82, and supplies the specification result to the defective pixel correction section 24.

[Configuration Example of Defective Pixel Correction Section]

Figure 4:
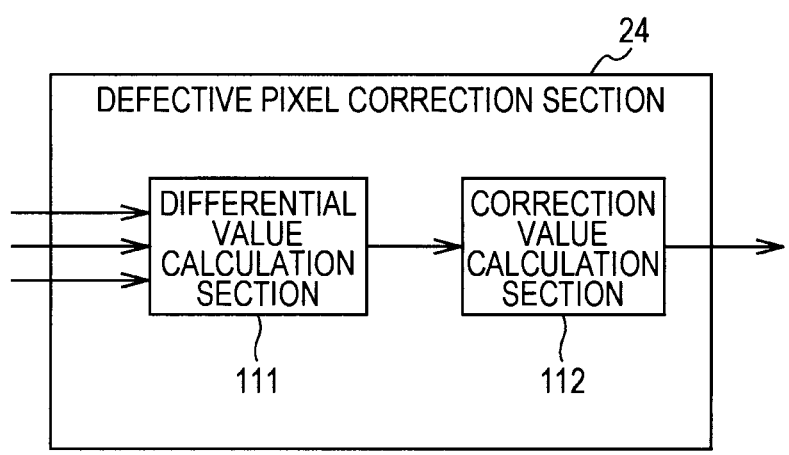
FIG. 4 is a diagram illustrating a configuration example of a defective pixel correction section.

In addition, in more detail, the defective pixel correction section 24 in FIG. 1 is configured as shown in FIG. 4. That is the defective pixel correction section 24 is configured from a differential value calculation section 111 and a correction value calculation section 112.

The differential value calculation section 111 supplies the selected pixels from the pixel selection section 81 as they are to the correction value calculation section 112 according to a defective pixel specification result which is supplied from the differential value comparison section 83, or supplies the differential values of the pixels in the vicinity of the target pixel along with the selected pixels to the correction value calculation section 112. In addition, the differential value calculation section 111 calculates the differential values of the pixels in the vicinity of the target pixel based on the selected pixels from the pixel selection section 81 and the direction information from the differential value comparison section 52.

The correction value calculation section 112 corrects the target pixel based on the selected pixels and the differential values in a case where the selected pixels and the differential values have been supplied from the differential value calculation section 111 and outputs the target pixel which has been corrected. In addition, the correction value calculation section 112 outputs the target pixel which is included in the selected pixels as it is in a case where only the selected pixels are supplied from the differential value calculation section 111.

[Description of Defective Pixel Correction Process]

Here, when the target pixel information is supplied to the image processing device 11 and the detection and correction of the target pixel is instructed, the image processing device 11 performs a defective pixel correction process, and corrects and outputs the pixel value of the target pixel as necessary. Below, the defective pixel correction process due to the image processing device 11 will be described with reference to the flowchart of FIG. 5.

The defective pixel correction process is performed for each pixel in the image which is the processing target where performing of the detection and correction of a defective pixel is to be attempted. Here, below, the image which is the processing target is formed from pixels of each color of R, G, and B and the pixels of each color are lined up in a Bayer arrangement. In addition, below, the pixels of each color of R, G, and B are referred to respectively as R pixels, G pixels, and B pixels.

In step S11, the vicinity region extraction section 21 extracts the vicinity region information from the target pixel information which has been input and supplies the vicinity region information to the differential value calculation section 51 of the texture direction determination section 22 and the pixel selection section 81 of the defective pixel detection section 23.

For example, in a case where the target pixel is a G pixel, the vicinity region extraction section 21 extracts G pixel which is included in a rectangular region from the rectangular region which is formed from nine pixels in the horizontal direction and nine pixels in the vertical direction which are centered on the target pixel in the image, and sets as the vicinity region information.

In step S12, the differential value calculation section 51 calculates the differential value in each direction based on the vicinity region information which is supplied from the vicinity region extraction section 21 and supplies the differential value to the differential value comparison section 52.

Here, the calculation of the differential value for each direction will be described with reference to FIGS. 6 to 9. Here, in FIGS. 6 to 9, the width direction and the height direction are respectively shown as the x direction and the y direction. In addition, in FIGS. 6 to 9, one square represents one pixel in the image and the pixel which is written with the letter "G" in the square out of these pixels is the G pixel.

Figure 6:
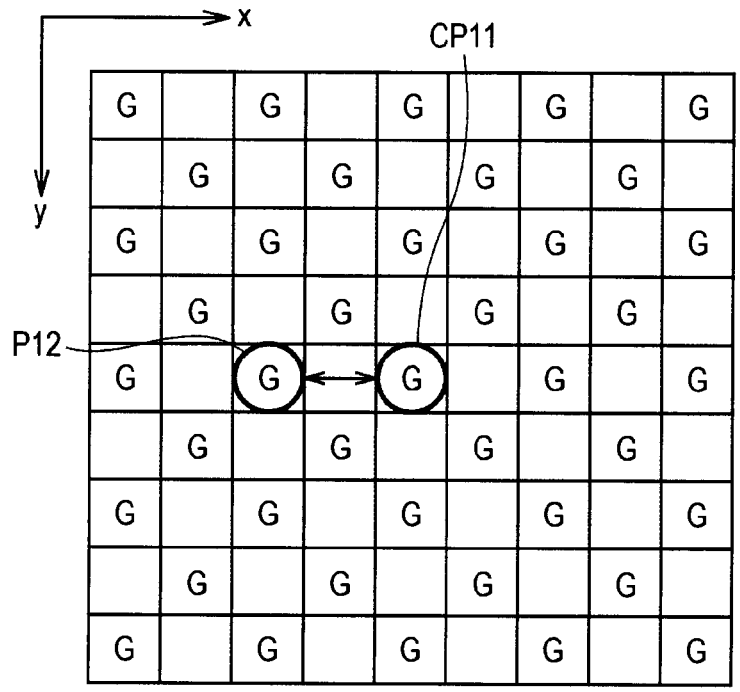
FIG. 6 is a diagram describing calculation of a differential value in a horizontal direction.

For example, as shown in FIG. 6, the G pixel in a rectangle region (referred to below as a target vicinity region) which is centered on a target pixel CP11 and is formed from nine pixels in the x direction and nine pixels in the y direction is supplied as the vicinity region information. In this case, the differential value calculation section 51-1 calculates a differential value GH in the horizontal direction (x direction) in the diagram with regard to the target vicinity region.

Specifically, the differential value calculation section 51-1 pairs the G pixels which are lined up adjacent to each other in the width direction in the diagram which is the target vicinity region. For example, the target pixel CP11 and a pixel P12 which is the G pixel which is adjacent on the left side of the target pixel CP11 in the diagram are set as a pair.

The differential value calculation section 51-1 calculates the differential value of the pixel values of the G pixels of the pair, that is, the absolute difference value of the pixel values, with regard to each of the pairs of the G pixels in the target vicinity region, and sets the total of the absolute difference values with regard to each of the pairs as the differential value GH in the horizontal direction.

For example, the G pixel with the coordinates (x,y) in the xy coordinate system and the G pixel with the coordinates (x−2,y) are set as a pair and the pixel value of the G pixel with the coordinates (x,y) is set as G(x,y), and the pixel value of the G pixel with the coordinates (x−2,y) is set as G(x−2,y). In this case, a differential value gradH(x,y) of the pair of the G pixels is determined by $|G(x,y)-G(x-2,y)|$.

The differential value gradH(x,y) indicates the size of the change in the pixel value of the G pixel in the horizontal direction (width direction) in the diagram in a position of the G pixel which is the processing target. It is possible for the differential value GH to indicate the size of the change of the pixel value of the G pixel in the horizontal direction in the overall target vicinity region from the differential value GH being the total of the differential values of each G pixel in the target vicinity region. For example, as the differential value GH is smaller, the change in the pixel value of the G pixel in the horizontal direction is smaller in the target vicinity region.

Figure 7:
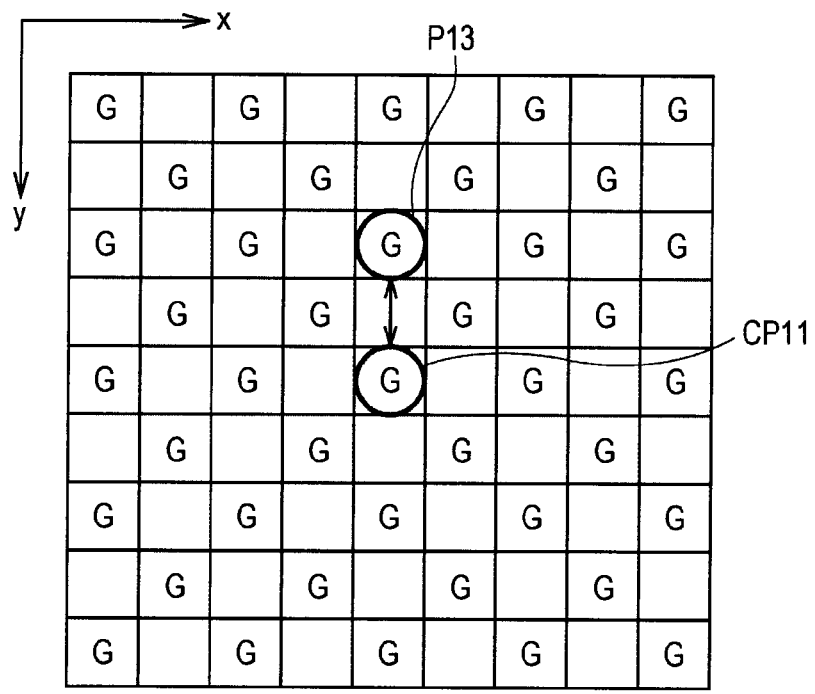
FIG. 7 is a diagram describing calculation of a differential value in a vertical direction.

In addition, for example, as shown in FIG. 7, the differential value calculation section 51-2 calculates a differential value GV in the vertical direction (y direction) in the diagram with regard to the target vicinity region.

Specifically, the differential value calculation section 51-2 pairs the G pixels which are lined up adjacent to each other in the height direction in the diagram, which are the target vicinity region. For example, the target pixel CP11 and a pixel P13 which is the G pixel which is adjacent on the upper side of the target pixel CP11 in the diagram are set as a pair.

The differential value calculation section 51-2 calculates the differential value of the pixel value of the G pixel of the pair with regard to each of the pairs of the G pixels in the target vicinity region, and sets the total of the absolute difference values with regard to each of the pairs as the differential value GV in the vertical direction.

For example, the G pixel with the coordinates (x,y) in the xy coordinate system and the G pixel with the coordinates (x,y−2) are set as a pair, and the pixel value of the G pixel with the coordinates (x,y) is set as G(x,y) and the pixel value of the G pixel with the coordinates (x,y−2) is set as G(x,y−2). In this case, a differential value gradV(x,y) of the pair of the G pixels is determined by $|G(x,y)-G(x,y-2)|$. Accordingly, the differential value GV indicates the size of the change in the G pixel in the vertical direction in the overall target vicinity region.

Figure 8:
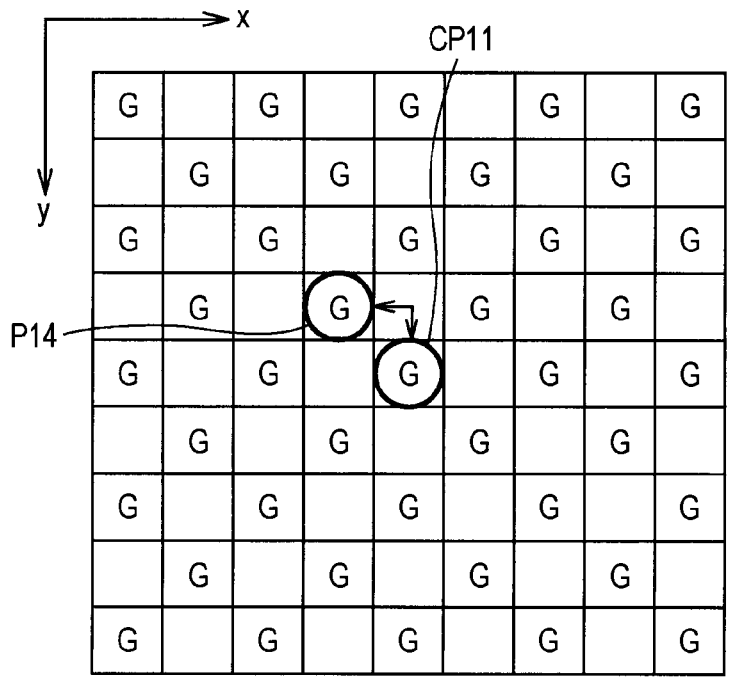
FIG. 8 is a diagram describing calculation of a differential value in a left diagonal direction.

Furthermore, for example, as shown in FIG. 8, the differential value calculation section 51-3 calculates a differential value GD in the upward left direction (left diagonal direction) in the diagram with regard to the target vicinity region.

Specifically, the differential value calculation section 51-3 pairs the G pixels which are lined up adjacent to each other in the left diagonal direction in the diagram, which are the target vicinity region. For example, the target pixel CP11 and a pixel P14 which is the G pixel which is adjacent on the upper left side of the target pixel CP11 in the diagram are set as a pair.

The differential value calculation section 51-3 calculates the differential value of the pixel values of the G pixels of the pair with regard to each of the pairs of the G pixels in the target vicinity region, and sets the total of the absolute difference values with regard to each of the pairs as the differential value GD in the left diagonal direction.

For example, the G pixel with the coordinates (x,y) in the xy coordinate system and the G pixel with the coordinates (x−1,y−1) are set as a pair, and the pixel value of the G pixel with the coordinates (x,y) is set as G(x,y) and the pixel value of the G pixel with the coordinates (x−1,y−1) is set as G(x−1,y−1). In this case, a differential value gradD(x,y) of the pair of the G pixels is determined by $|G(x,y)-G(x-1,y-1)|$. Accordingly, the differential value GD indicates the size of the change in the G pixel in the left diagonal direction in the overall target vicinity region.

Figure 9:
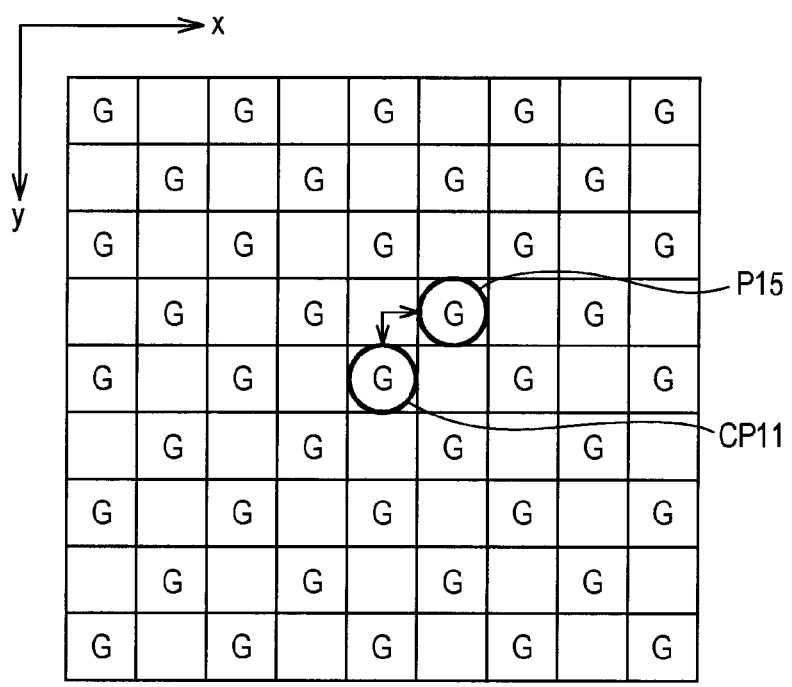
FIG. 9 is a diagram describing calculation of a differential value in a right diagonal direction.

Furthermore, for example, as shown in FIG. 9, the differential value calculation section 51-4 calculates a differential value GA in the upward right direction (right diagonal direction) in the diagram with regard to the target vicinity region.

Specifically, the differential value calculation section 51-4 pairs the G pixels which are lined up adjacent to each other in the right diagonal direction in the diagram, which are the target vicinity region. For example, the target pixel CP11 and a pixel P15 which is the G pixel which is adjacent on the upper right side of the target pixel CP11 in the diagram are set as a pair.

The differential value calculation section 51-4 calculates the differential value of the pixel values of the G pixels of the pair with regard to each of the pairs of the G pixels in the target vicinity region and sets the total of the absolute difference values with regard to each of the pairs as the differential value GA in the right diagonal direction.

For example, the G pixel with the coordinates (x,y) in the xy coordinate system and the G pixel with the coordinates (x+1,y−1) are set as a pair and the pixel value of the G pixel with the coordinates (x,y) is set as G(x,y) and the pixel value of the G pixel with the coordinates (x+1,y−1) is set as G(x+1,y−1). In this case, a differential value gradA(x,y) of the pair of the G pixels is determined by |(G(x,y)−G(x+1,y−1)|. Accordingly, the differential value GA indicates the size of the change in the G pixel in the left diagonal direction in the overall target vicinity region.

As above, when the differential value calculation section 51-1 and the differential value calculation section 51-4 calculates the differential value GH, the differential value GV, the differential value GD, and the differential value GA for each direction in the target vicinity region, the differential values are supplied to the differential value comparison section 52.

Figure 5:
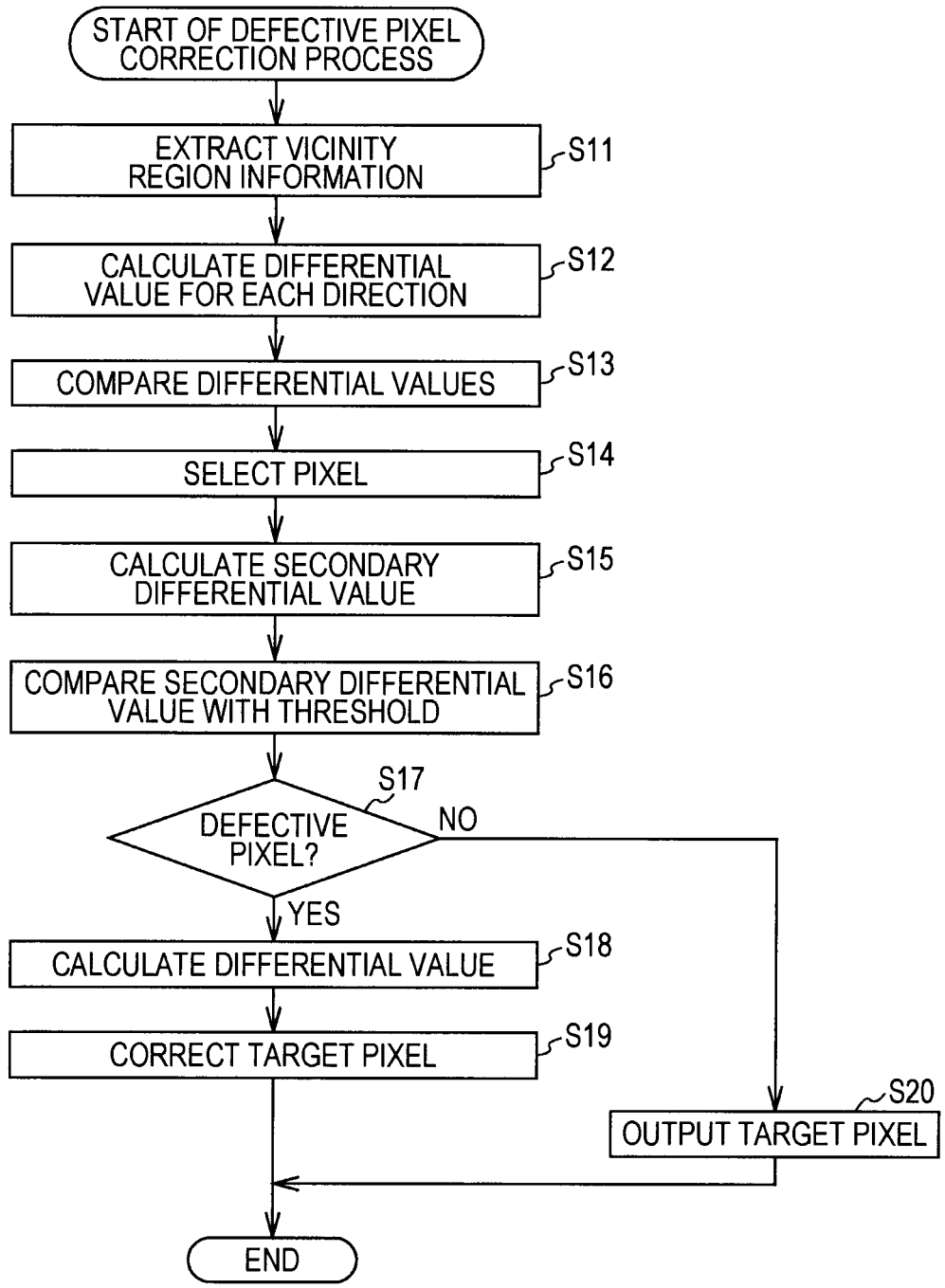
FIG. 5 is a flowchart describing a defective pixel correction process.

Returning to the flowchart of FIG. 5, when the differential values for each direction are calculated in step S12, the process proceeds to step S13.

In step S13, the differential value comparison section 52 specifies the texture direction in the image by comparing the differential values in each direction which have been supplied from the differential value calculation sections 51.

Specifically, the differential value comparison section 52 selects the differential value with the smallest value out of the differential value GH, the differential value GV, the differential value GD, and the differential value GA, and sets the direction of the differential value which has been selected as the texture direction. For example, it is assumed that the differential value GH in the horizontal direction has the smallest value out of the differential values for each direction. In this case, the horizontal direction is the direction with the smallest change in the pixel value out of the horizontal direction, the vertical direction, the left diagonal direction, and the right diagonal direction in the target vicinity region.

The differential value comparison section 52 specifies the direction where the change in the pixel value is the smallest in the vicinity of the target pixel in the image, that is, the direction where the change in pattern is small, as the texture direction. When the texture direction is specified in this manner, the differential value comparison section 52 supplies the texture direction to the pixel selection section 81 of the defective pixel detection section 23 and the differential value calculation section 111 of the defective pixel correction section 24.

In step S14, the pixel selection section 81 selects the pixels which are used in the detection and correction of a defective pixel as the selected pixels based on the vicinity region information from the vicinity region extraction section 21 and the direction information from the differential value comparison section 52, and the pixels are supplied to the secondary differential value calculation section 82 and the differential value calculation section 111.

In step S15, the secondary differential value calculation section 82 calculates three values of the secondary differential value $L_1$ to the secondary differential value $L_3$ based on the selected pixels which are supplied from the pixel selection section 81 and the secondary differential values are supplied to the differential value comparison section 83.

Figure 10:
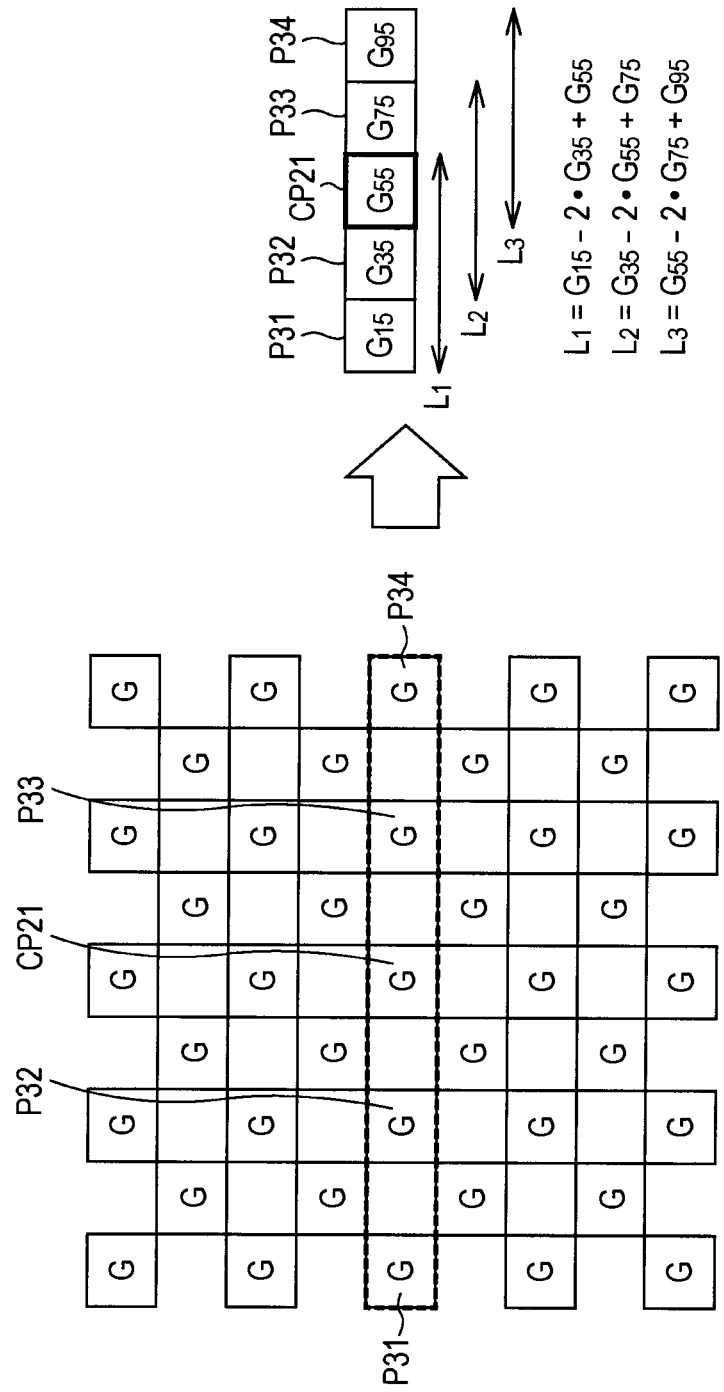
FIG. 10 is a diagram describing calculation of a secondary differential value.

For example, in a case where the texture direction which is indicates in the direction information is the horizontal direction, the pixel selection section 81 selects five G pixels, which are centered on a target pixel CP21 and are lined up to be continuous in the horizontal direction, out of the G pixels in the vicinity of the target pixel as the selected pixels as shown in FIG. 10. Here, in FIG. 10, one square represents one pixel in the image, and the pixel which is written with the letter "G" in the square out of these pixels is the G pixel.

In the example of FIG. 10, the pixel P31 to the pixel P34 and the target pixel CP21 which are lined up to be continuous in the horizontal direction in the diagram are selected as the selected pixels. Here, as shown in the right side of the diagram, the pixel values of the pixel P31 to the pixel P34 and the target pixel CP21 are respectively set as $G_{15}$, $G_{35}$, $G_{75}$, $G_{95}$, and $G_{55}$.

When the pixels which are lined up in the texture direction are selected as the selected pixels from the target vicinity region, the secondary differential value calculation section 82 calculates the three secondary differential values using the selected pixels.

Specifically, as shown in the right side in the diagram, with regard to the grouping of the G pixels where three are continuous by being lined up in the texture direction with the position of the target pixel CP21 on the right edge in the diagram, the secondary differential value calculation section 82 calculates the Laplacian of the grouping as the secondary differential value $L_1$. That is, the secondary differential value $L_1=G_{15}-2G_{35}+G_{55}$ is calculated based on the respective pixels values of the pixels of the pixel P31, the pixel P32, and the target pixel CP21.

In the same manner, with regard to the grouping of the G pixels where three are continuous by being lined up in the texture direction with the position of the target pixel CP21 in the center in the diagram, the secondary differential value calculation section 82 calculates the Laplacian of the grouping as the secondary differential value $L_2$. That is, the secondary differential value $L_2=G_{35}-2G_{55}+G_{75}$ is calculated based on the respective pixels values of the pixels of the pixel P32, the target pixel CP21, and the pixel P33.

Furthermore, with regard to the grouping of the G pixels where three are continuous by being lined up in the texture direction with the position of the target pixel CP21 on the left edge in the diagram, the secondary differential value calculation section 82 calculates the Laplacian of the grouping as the secondary differential value $L_3$. That is, the secondary differential value $L_3=G_{55}-2G_{75}+G_{95}$ is calculated based on the respective pixels values of the pixels of the target pixel CP21, the pixel P33, and the pixel P34.

In this manner, out of the three pixels which are lined up to be continuous in the texture direction, the difference of the value which is acquired by multiplying the pixel value of the center pixel by two and the sum of the pixel values of the pixels which are positioned on both sides of the center pixel is calculated as the secondary differential value. When the secondary differential value $L_1$, the secondary differential value $L_2$, and the secondary differential value $L_3$ are calculated using the selected pixels in this manner, the secondary differential value calculation section 82 supplies the secondary differential values which have been calculated to the differential value comparison section 83.

In addition, for example, in a case where the texture direction which is indicated in the direction information is the right diagonal direction, the pixel selection section 81 selects five G pixels, which are centered on a target pixel CP31 and are lined up to be continuous in the right diagonal direction, out of the G pixels in the vicinity of the target pixel as the selected pixels as shown in FIG. 11. Here, in FIG. 11, one square represents one pixel in the image and the pixel which is written with the letter "G" in the square out of these pixels is the G pixel.

In the example of FIG. 11, the pixel P41 to the pixel P44 and the target pixel CP31 which are lined up to be continuous in the right diagonal direction in the diagram are selected as the selected pixels. Here, as shown in the right side of the diagram, the pixel values of the pixel P41 to the pixel P44 and the target pixel CP31 are respectively set as $G_{37}$, $G_{46}$, $G_{64}$, $G_{73}$, and $G_{55}$.

When the selected pixels are selected from the target vicinity region, as shown in the right side in the diagram, with regard to the grouping of the G pixels where three are continuous by being lined up in the texture direction with the position of the target pixel CP31 on the right edge in the diagram, the secondary differential value calculation section 82 calculates the secondary differential value $L_1$. That is, the secondary differential value $L_1 = G_{37} - 2G_{46} + G_{55}$ is calculated based on the respective pixels values of the pixels of the pixel P41, the pixel P42, and the target pixel CP31.

In the same manner, with regard to the grouping of the G pixels where three are continuous by being lined up in the texture direction with the position of the target pixel CP31 in the center in the diagram, the secondary differential value calculation section 82 calculates the secondary differential value $L_2$. That is, the secondary differential value $L_2 = G_{46} - 2G_{55} + G_{64}$ is calculated based on the respective pixels values of the pixels of the pixel P42, the target pixel CP31, and the pixel P43.

Furthermore, with regard to the grouping of the G pixels where three are continuous by being lined up in the texture direction with the position of the target pixel CP31 on the left edge in the diagram, the secondary differential value calculation section 82 calculates the secondary differential value $L_3$. That is, the secondary differential value $L_3 = G_{55} - 2G_{64} + G_{73}$ is calculated based on the respective pixels values of the pixels of the target pixel CP31, the pixel P43, and the pixel P44.

Returning to the description of the flowchart in FIG. 5, when the secondary differential values are calculated, the process proceeds from step S15 to step S16.

In step S16, the differential value comparison section 83 specifies whether or not the target pixel is a defective pixel by comparing the secondary differential value $L_1$ to the secondary differential value $L_3$ which are supplied from the secondary differential value calculation section 82 with a predetermined threshold τ, and supplies the specification result to the differential value calculation section 111 of the defective pixel correction section 24.

Specifically, the differential value comparison section 83 sets the target pixel as a defective pixel in a case where the secondary differential value $L_1 > τ$, the secondary differential value $L_2 > τ$, and secondary differential value $L_3 > τ$. That is, the target pixel is set as a defective pixel in a case where all of the three secondary differential values are larger than the threshold τ.

For example, the secondary differential values are Laplacians which are calculated using the three pixels which are lined up in a direction where the change in the pixel value is small. Since the pixel values of the three pixels which are used in the calculation of the secondary differential value are expected to be values which are substantially the same value, the secondary differential value is expected to be sufficiently small.

Here, when a defective pixel is included among the pixels which are used in the calculation of the secondary differential value, since the pixel value of the defective pixel is largely different to the pixel values of the other pixels, the secondary differential values which are calculated using the defective pixel is larger than the threshold t.

Here, in the calculation of each of the three values of the secondary differential value $L_1$ to the secondary differential value $L_3$, since the target pixel is necessarily used, any of the three secondary differential values is larger than the threshold t if the target pixel is a defective pixel. This is the same even in the case where another pixel which is adjacent to the target pixel is a defective pixel. Therefore, the differential value comparison section 83 sets the target pixel as a defective pixel in a case where all of the three secondary differential values are larger than the threshold t.

Figure 12:
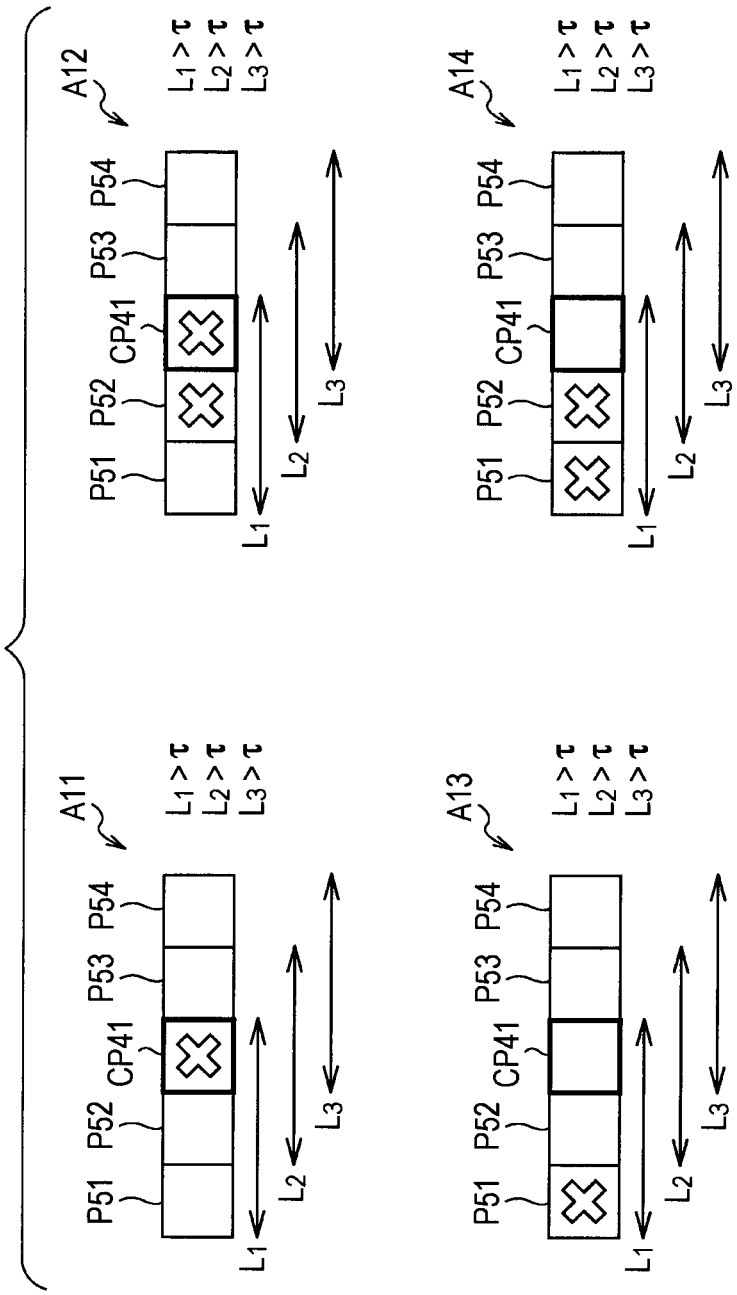
FIG. 12 is a diagram describing detection of a defective pixel.

For example, as shown by an arrow A11 in FIG. 12, a pixel P51, a pixel P52, a target pixel CP41, a pixel P53, and a pixel P54 which are centered on the target pixel CP41 and lined up in the texture direction are selected as the selected pixels. Here, in FIG. 12, in the diagram, one square represents one pixel, and in particular, the square with a cross mark is a defective pixel.

In the example which is indicated by the arrow A11, the target pixel CP41 is a defective pixel and other pixels which are selected as the selected pixels are normal pixels which are not defective pixels.

In this case, the pixel P51, the pixel P52, and the target pixel CP41 are used in the calculation of the secondary differential value $L_1$, and the pixel P52, the target pixel CP41, and the pixel P53 are used in the calculation of the secondary differential value $L_2$. In addition, the target pixel CP41, the pixel P53, and the pixel P54 are used in the calculation of the secondary differential value $L_3$.

Accordingly, in the example, since the target pixel CP41 which is a defective pixel is used in the calculation of the secondary differential value $L_1$ to the secondary differential value $L_3$, the secondary differential values are larger than the threshold τ and the target pixel CP41 is correctly specified as a defective pixel.

In the example indicated by the arrow A11, the target pixel CP41 is a defective pixel, but it is an example where the pixel P52 and the pixel P53 which are adjacent on both sides of the target pixel CP41 are normal pixels which are not defective. In a case where only the target pixel is defective and the adjacent pixels with the same color as the target pixel are not defective in this manner, the target pixel is particularly referred to as a single defective pixel.

In addition, as shown by an arrow A12, in a case where the target pixel CP41 and the pixel P52 which is adjacent on the left side of the target pixel CP41 are defective pixels, at least one defective pixel is used in the calculation of each of the secondary differential value $L_1$ to the secondary differential value $L_3$. As a result, each of the secondary differential values is larger than the threshold τ and the target pixel CP41 is correctly specified as a defective pixel also in this case.

In the example indicated by the arrow A12, it is an example where the target pixel CP41 is a defective pixel and the pixel P52 which is adjacent to the target pixel CP41 is also a defective pixel. In a case where not only the target pixel but also the pixel which is adjacent to the target pixel is a defective pixel in this manner, the target pixel is particularly referred to as a continuous defective pixel.

Here, in the case of the single defect shown by the arrow A11, the three secondary differential values (Laplacian) are substantially the same value, while in the case of the continuous defect shown by the arrow A12, the values of two of the secondary differential values such as the secondary differential value $L_1$ and the secondary differential value $L_3$ are largely different. As a result, it is possible to determine in the differential value comparison section 83 whether the target pixel is a single defective pixel or a continuous defective pixel by comparing the three secondary differential values.

On the other hand, as shown by an arrow A13, in a case where there is no defect in the target pixel CP41 and there is a defect only in the pixel P51 surrounding the target pixel CP41, the pixel P51 which is a defective pixel is used in the calculation of the secondary differential value $L_1$, but the pixel P51 is not used in the calculation of the secondary differential value $L_2$ and the secondary differential value $L_3$. Not any of the pixels which are used in the calculation of the secondary differential value $L_2$ and the secondary differential value $L_3$ are defective pixels.

As a result, the secondary differential value $L_1$ is larger than the threshold τ, but the secondary differential value $L_2$ and the secondary differential value $L_3$ are less than the threshold τ and the target pixel CP41 is correctly specified as a normal pixel which is not defective.

In the same manner, as shown by an arrow A14, in a case where there is no defect in the target pixel CP41 and there are defects in the pixel P51 and the pixel P52 surrounding the target pixel CP41, the secondary differential value $L_1$ and the secondary differential value $L_2$ which are calculated using the defective pixels are larger than the threshold τ. However, since the secondary differential value $L_3$ which is calculated using the target pixel CP41, the pixel P53, and the pixel P54 which are not defective pixels is less than the threshold τ, the target pixel CP41 is correctly specified as a normal pixel which is not defective also in this case.

In the examples which are shown by the arrow A13 and the arrow A14, the target pixel CP41 is a normal pixel which is not defective and the secondary values are calculated using only the pixels which are not defective when calculating any of the three secondary differential values. Accordingly, even in the case where the pixel out of the selected pixels other than the target pixel is a defective pixel, at least one secondary differential value which is less than the threshold τ is acquired and it is correctly specified that the target pixel is a normal pixel. This is the same in a case where there are continuous defects in the selected pixels other than the target pixel. That is, even in a case where there are defective pixels which are different to the target pixel and are adjacent to each other in the selected pixels, it is possible to correctly specify whether the target pixel is a defective pixel.

As above, it is possible to simply specify whether the target pixel is a defective pixel with a high degree of accuracy without depending on whether the target pixel is a single defective pixel or whether the target pixel is a continuous defective pixel if the three secondary differential values are calculated using the pixels which are lined up in the texture direction and the secondary differential values are compared with the threshold. Here, in more detail, while there are cases where there is erroneous correction due to the number or position of the defective pixel which is included in the selected pixel, it is possible to detect a defective pixel with a high degree of accuracy with a simpler process than the related art in the defective pixel detection section 23.

In addition, the threshold τ which is compared with the secondary differential values may be a constant value which is fixed or may change in an appropriate manner according to the differential values which are calculated due to the differential value calculation section 51 with a specific texture direction. In addition, the threshold which is different due to the color of the target pixel may be used.

Returning to the flowchart of FIG. 5, when whether or not the target pixel is a defective pixel has been specified, the differential value comparison section 83 supplies the specification result to the differential value calculation section 111 of the defective pixel correction section 24, and after that, the process proceeds to step S17.

In step S17, the differential value calculation section 111 determines whether or not the target pixel is a defective pixel based on the specification result on whether or not the target pixel is a defective pixel which is supplied from the differential value comparison section 83.

In a case where it is determined in step S17 that the target pixel is a defective pixel, the differential value calculation section 111 calculates the differential values in step S18 based on the direction information from the differential value comparison section 52 and the selected pixels which are supplied from the pixel selection section 81. The differential value calculation section 111 supplies the differential values which have been calculated and the selected pixels to the correction value calculation section 112.

Then, in step S19, the correction value calculation section 112 corrects the target pixel based on the differential values and the selected pixels which have been supplied from the differential value calculation section 111, and outputs the target pixel after correction at a later stage.

Figure 13:
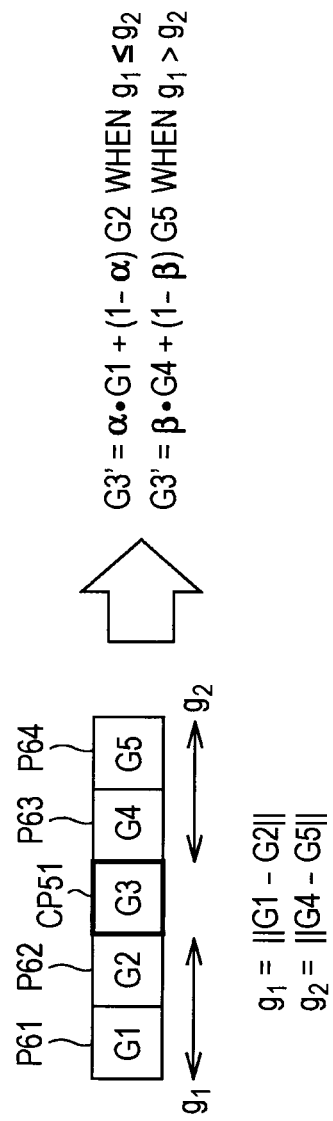
FIG. 13 is a diagram describing correction of a defective pixel.

For example, as shown in FIG. 13, it is assumed that a pixel P61, a pixel P62, a target pixel CP51, a pixel P63, and a pixel P64 which are lined up in the texture direction are supplied to the differential value calculation section 111 as the selected pixels. Here, in FIG. 13, one square represents one pixel and the characters in each of the squares indicate the pixel values of the pixels which are represented by squares. That is, the pixel values of each of the pixels of the pixel P61, the pixel P62, the target pixel CP51, the pixel P63, and the pixel P64 respectively are G1, G2, G3, G4, and G5.

In a case such as this, the differential value calculation section 111 calculates a differential value $g_1$ from the two pixels of the pixel P61 and the pixel P62 which are adjacent in the left side of the target pixel CP51 in the diagram. That is, the differential value $g_1=|G1-G2|$ and the absolute value of the difference of the pixels values of the pixel P61 and the pixel P62 is calculated as the differential value $g_1$.

In addition, the differential value calculation section 111 calculates a differential value $g_2$ from the two pixels of the pixel P63 and the pixel P64 which are adjacent in the right side of the target pixel CP51 in the diagram. That is, the differential value $g_2=|G4-G5|$ and the absolute value of the difference of the pixels values of the pixel P63 and the pixel P64 is calculated as the differential value $g_2$.

In this manner, when the differential value $g_1$ on the left side of the target pixel CP51 and the differential value $g_2$ on the right side of the target pixel CP51 have been calculated, the correction value calculation section 112 corrects the pixel value of the target pixel CP51 using the differential values.

Specifically, in a case where the differential value $g_1$ is equal to or less than the differential value $g_2$, the correction value calculation section 112 calculates a pixel value G3' of the target pixel CP51 after correction by the pixel value G1 of the pixel P61 and the pixel value G2 of the pixel P62 being added in a weighted manner (weighted average) with a predetermined weighting α. That is, $G3'=\alpha \cdot G1+(1-\alpha)G2$ is calculated.

Since the pixel which are lined up in the texture direction, that is, the direction where the change in the pixel value is small, if the absolute difference value of the pixels which are selected as the selected pixels and are adjacent to each other, that is, the differential value, is small, there is a high probability that the pixel is not a defective pixel. Accordingly, in a case where the differential value $g_1$ is equal to or less than the differential value $g_2$, the probability that the grouping of the pixel P61 and the pixel P62 includes a defective pixel is lower than the pixel P63 and the pixel P64.

Therefore, the correction value calculation section 112 calculates the pixel value G3' of the target pixel CP51 after correction using the pixel P61 and the pixel P62 which have a lower probability of being defective pixels out of the pixels which are adjacent to the target pixel CP51.

On the other hand, in a case where the differential value $g_1$ is larger than the differential value $g_2$, the correction value calculation section 112 calculates the pixel value G3' of the target pixel CP51 after correction by the pixel value G4 of the pixel P63 and the pixel value G5 of the pixel P64 being added in a weighted manner (weighted average) with a predetermined weighting $\beta$. That is, $G3'=\beta \cdot G4+(1-\beta)G5$ is calculated.

In this manner, according to the values of the differential value $g_1$ and the differential value $g_2$, it is possible for the appropriate correction value of the target pixel CP51 to be acquired even in a case where the target pixel CP51 is a continuous defective pixel by correcting the target pixel using only pixel which are adjacent on one side of the target pixel CP51. Here, it is possible for the weighting $\alpha$ and $\beta$ which are used in the correction of the target pixel CP51 to be arbitrary values between zero and one.

Returning to the flowchart of FIG. 5, when the target pixel has been corrected, the correction value calculation section 112 outputs the pixel value of the target pixel after correction, and the defective pixel correction process is complete.

On the other hand, in a case where it is determined in step S17 that the target pixel is not a defective pixel, the differential value calculation section 111 supplies the selected pixel which are supplied from the pixel selection section 81 to the correction value calculation section 112, and after that the process proceeds to step S20.

In step S20, the correction value calculation section 112 extracts the target pixel from the selected pixels which are supplied from the differential value calculation section 111, and the defective pixel correction process is completed by the target value of the target pixel being outputted as it is. That is, in this case, since the target pixel is not a defective pixel, the correction with regard to the target pixel is not performed and the pixel value of the target pixel is output as it is at a later stage.

As above, the image processing device 11 calculates the plurality of secondary differential values using several pixels including the target pixel which are lined up in the texture direction, and whether or not the target pixel is a defective pixel is specified by a threshold process with the secondary differential values.

Due to this, it is possible to simply detect a defective pixel with a high degree of accuracy without depending on whether the target pixel is a single defective pixel or whether the target pixel is a continuous defective pixel and it is possible to reduce the scale of the circuit in the image processing device 11 and to improve the processing speed.

In addition, in a case where the target pixel is a defective pixel, it is possible to more appropriately correct the target pixel since the target pixel is corrected using the pixels with a lower possibility of being defective pixels out of the pixels which are lined up in the texture direction of the target pixel.

For example, by performing detection of defective pixels along the texture direction, it is possible to prevent excessive correction with the texture as a defect and deterioration in image quality in the texture portion which includes a high frequency component such as a stripe pattern. In addition, it is possible to reduce erroneous correction in a gradation portion where the pattern of the image smoothly changes due to detection of the defective pixels using the secondary differential values (Laplacians).

Here, the cases of the pixels which are used in the determination of the texture direction and the pixels which are used in the detection of defective pixels are the same color as the target pixel have been described above, but the pixels which are used in the determination of the texture direction are not necessarily the same color as the target pixel.

In a case such as this, for example, when the target pixel is an R pixel, the texture direction is specified in the texture direction determination section 22 using the G pixels which are in the vicinity of the target pixel and the specification of whether or not the target pixel is a defective pixel is performed in the detective pixel detection section 23 using the R pixel which is the same color as the target pixel.

Particularly, in a case where the disposition of each color of the pixels in the image is in a Bayer arrangement, since more of the G pixels than the pixels of other colors are included in the image, it is possible to specify the texture direction with a higher degree of accuracy if the texture direction is specified using the G pixels.

MODIFIED EXAMPLE 1

In addition, a case is described where the five pixels which are centered on the target pixel and are continuous by being lined up in the texture direction are the selected pixels and the detection of defective pixels is performed using the selected pixels, but the selected pixels may be six or more.

Figure 14:
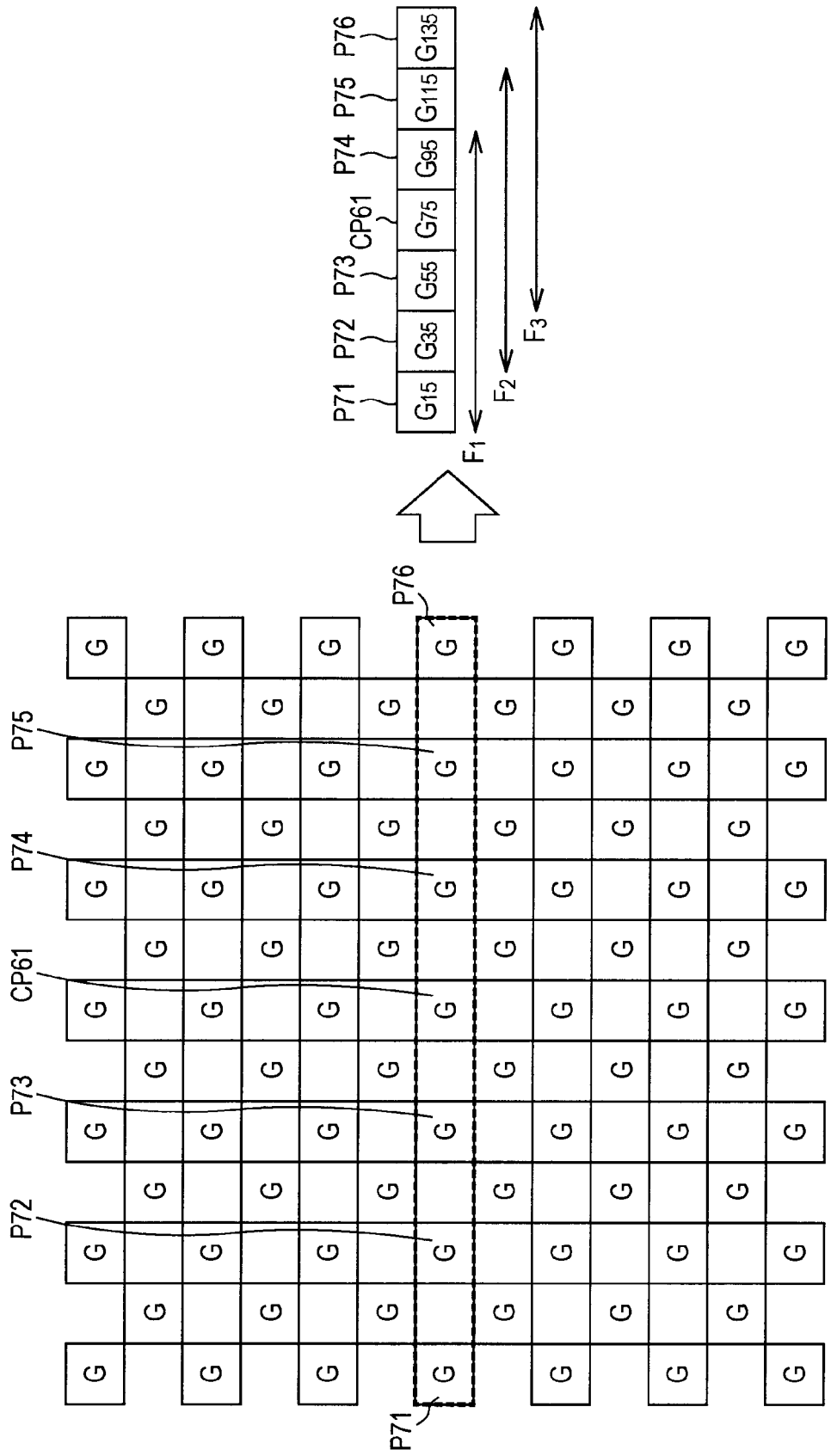
FIG. 14 is a diagram describing detection of continuous defective pixels.

That is, for example, as shown in FIG. 14, the vicinity target region of 13 pixels in the horizontal direction and 13 pixels in the vertical direction which are centered on the target pixel CP61 is extracted and the texture direction which is indicated by the direction information is the horizontal direction.

Here, in FIG. 14, one square is one pixel in the image and the pixel which is written with the letter "G" in the square out of these pixels is the G pixel.

In the example of FIG. 14, the pixel selection section 81 selects seven G pixels which are centered on the target pixel CP61 and are lined up to be continuous in the horizontal direction are selected out of the G pixels which are in the vicinity of the target pixel as the selected pixels. That is, the pixel P71 to the pixel P76 and the target pixel CP61 which are lined up to be continuous in the width direction in the diagram are selected as the selected pixels. Here, as shown in the right side of the diagram, the pixel values of the pixel P71 to the pixel P76 and the target pixel CP61 are respectively set as $G_{15}$, $G_{35}$, $G_{55}$, $G_{95}$, $G_{115}$, $G_{135}$, and $G_{75}$.

In this case, the secondary differential value calculation section 82 calculates the three values of a function value $F_1$ to a function value $F_3$ using the five pixels which are lined up to be continuous out of the selected pixels. Here, the function value $F_1$ to the function value $F_3$ are arbitrary functions where the value becomes larger in a case where a defective pixel is included in the pixels which are used in the calculation of the function value.

In a case where the function value $F_1$ is calculated, the pixel P71 to the pixel P73, the target pixel CP61, and the pixel P74 are used. That is, for example, the function value $F_1=G_{15}+2G_{35}-6G_{55}+2G_{75}+G_{95}$ is calculated. In the same manner, in a case where the function value $F_2$ is calculated, the pixel P72, the pixel P73, the target pixel CP61, the pixel P74, and the pixel P75 are used and in a case where the function value $F_3$ is calculated, the pixel P73, the target pixel CP61, and the pixel P74 to the pixel P76 are used.

It is possible for the differential value comparison section 83 to specify whether the target pixel CP61 is a defective pixel from the comparison result from the comparison of the function value $F_1$ to the function value $F_3$ with the threshold. In this case, it is possible to correctly determine whether or not the target pixel CP61 is a defective pixel even when the target pixel CP61 is one out of three defective pixels with the same color which are continuous, that is, even when there are three continuous defective pixels.

Here, it is possible to support even in a case where the target pixel is a pixel which configures continuous defective pixel which are four or more, if the target vicinity region is made larger and the number of pixels which are used in the calculation of the function value in the detection of the defective pixels.

MODIFIED EXAMPLE 2

Furthermore, an example has been described above where the disposition of the pixels of each color in the image which is a processing target is in a Bayer arrangement, but the pixels of each color may have any disposition without being limited to a Bayer arrangement.

For example, as shown in FIG. 15, other than the R pixel, the G pixel, and the B pixel, furthermore, a pixel which is transparent (white) may be disposed (referred to below as a W pixel) in the image. Here, in FIG. 15, one square represents one pixel and the letters "R", "G", "B", and "W" in the squares respectively indicate the R pixel, the G pixel, the B pixel, and the W pixel.

In this case, it is possible to treat the W pixel in the same manner as the G pixel in a Bayer arrangement and it is possible to treat the W pixel in the same manner as the R pixel and the B pixel in a Bayer arrangement. However, in the example of FIG. 15, since the number of samples of the R pixels and the B pixels are small, support is necessary where the target vicinity region is set to be larger than in the case of the G pixel and the W pixel and the number of the continuous defects where detection is possible is reduced in order to detect the defective pixels with the pixel as the target pixel.

MODIFIED EXAMPLE 3

Furthermore, the specification of the texture direction using the pixels with a predetermined color has been described above, but the texture direction may be specified using other information (signals).

For example, in a case where the pixels with each color of Gr, Gb, R and B are disposed in the image, as shown in FIG. 16, brightness values (brightness signals) may be determined from the pixels and the texture direction may be specified using the differential values of the brightness values. Here, in FIG. 16, one square represents one pixel and the letters "R", "B", "Gr", and "Gb" in the squares respectively indicate the R pixel, the B pixel, the Gr pixel, and the Gb pixel. In addition, one circle in the diagram indicates the position of the brightness signal.

In this case, the differential value calculation section 51 determines the total of the pixels values of the four pixels, that is, each of the pixels of the R pixel, the B pixel, the Gr pixel, and the Gb pixel, which are adjacent to the circle which shows the position of the brightness signal, and sets the total which is acquired as the value of the brightness signal (the brightness value). Then, the differential value calculation section 51 determines the absolute difference value of the brightness signals for each pair of positions of the brightness signals which are adjacent in a predetermined direction and the total of the absolute difference values is the differential value. In addition, in a case where the texture direction is specified using the brightness signals, the detection and correction of the defective pixel uses the pixels with the same color as the target pixel.

Second Embodiment

[Configuration Example of Image Processing Device]

Here, in a case where the pixels in the image are a Bayer arrangement, since the sampling interval of the B pixel and the R pixel with the G pixel are different, it is necessary in a case of processing the G pixels that the target vicinity region is larger than in a case where the R pixels and the B pixels are processed, when processing in the same manner is performed using the pixels of each color.

Figure 17:
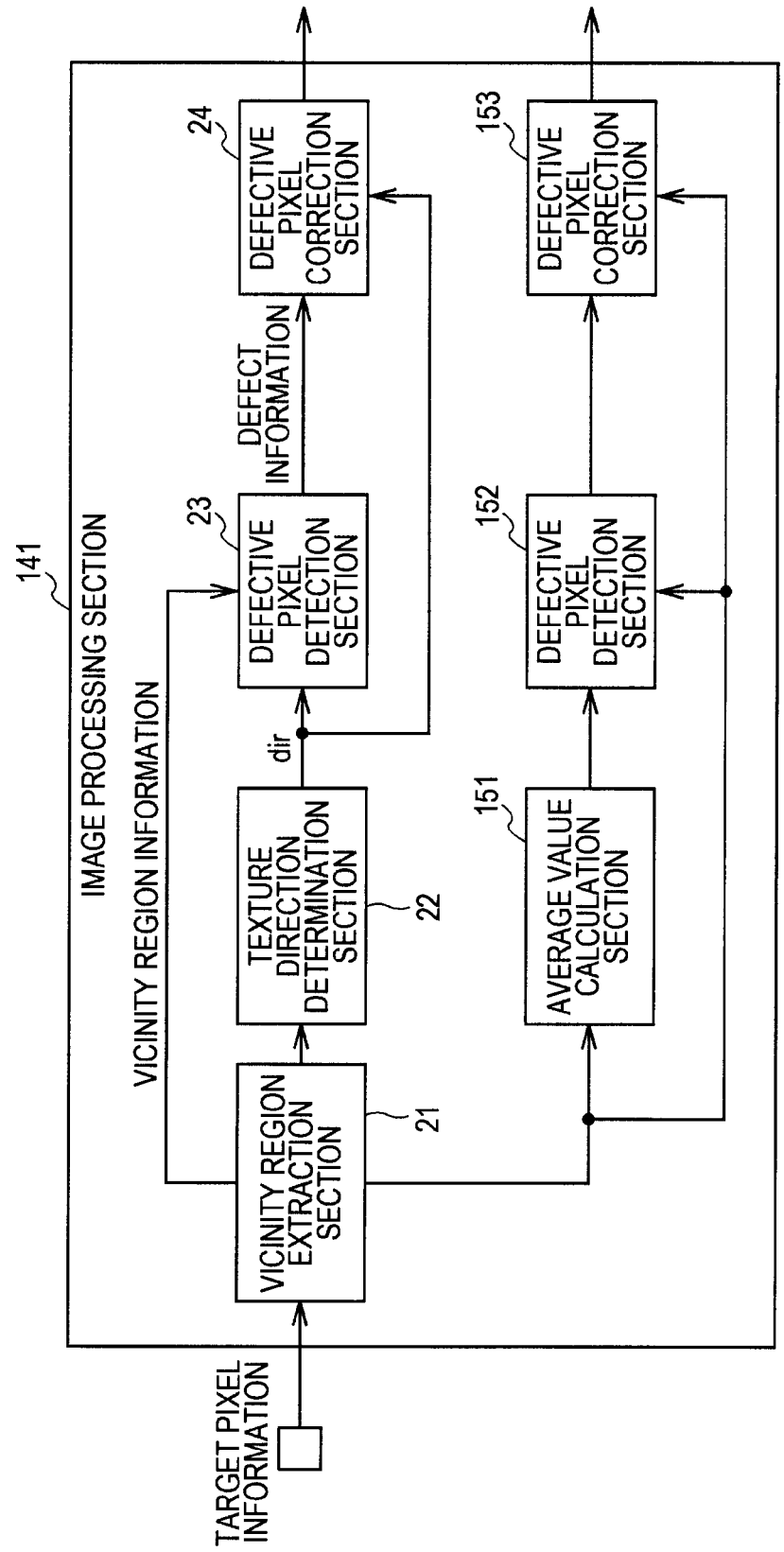
FIG. 17 is a diagram illustrating another configuration example of an image processing device.

Therefore, the detection of the defective pixels and the correction of the defectives pixels may be performed using a different method according to the color of the target pixel. In a case such as this, for example, the image processing section is configured as shown in FIG. 17. Here, in FIG. 17, the same reference numeral is attached to the portions which correspond to the case of FIG. 1 and the description thereof is appropriately omitted.

An image processing device 141 in FIG. 17 processes an image where, for example, the pixels of each color are disposed in a Bayer arrangement and performs correction of the target pixel as necessary with each of the pixels in the image as the target pixel in order.

The image processing device 141 is configured from the vicinity region extraction section 21, the texture direction determination section 22, the defective pixel detection section 23, the defective pixel correction section 24, an average value calculation section 151, a defective pixel detection section 152, and a defective pixel correction section 153.

The vicinity region extraction section 21 extracts the vicinity region information from the target pixel information which has been supplied, and switches the output destination of the vicinity region information according to the color of the target pixel. That is, the vicinity region extraction section 21 supplies the vicinity region information to the texture direction determination section 22 and the defective pixel detection section 23 in a case where the target pixel is the G pixel, and supplies the vicinity region information to the average value calculation section 151 and the defective pixel correction section 153 in a case where the target pixel is the R pixel or the B pixel.

The average value calculation section 151 calculates the average pixel value of the pixels with the same color as the target pixel in the target vicinity region from the vicinity region information which is supplied from the vicinity region extraction section 21, and supplies the average pixel value to the defective pixel detection section 152. The defective pixel detection section 152 specifies whether or not the target pixel is a defective pixel based on the vicinity region information which is supplied from the vicinity region extraction section 21 and the average pixel value which is supplied from the average value calculation section 151, and the specification result is supplied to the defective pixel correction section 153.

The defective pixel correction section 153 corrects and outputs the target pixel as necessary based on the specification result from the defective pixel detection section 152 and the vicinity region information which is supplied from the vicinity region extraction section 21.

[Description of Defective Pixel Correction Process]

Next, a defective pixel correction process using the image processing device 141 will be described.

In step S51, the vicinity region extraction section 21 determines whether the target pixel is a G pixel based on the target pixel information which has been input.

In a case where it is determined in step S51 that the target pixel is not a G pixel, that is, in a case where the target pixel is an R pixel or a B pixel, the vicinity region extraction section 21 extracts the vicinity region information from the target pixel information which has been supplied in step S52. Then, the vicinity region extraction section 21 supplies the vicinity region information to the average value calculation section 151 and the defective pixel correction section 153.

In step S53, the average value calculation section 151 calculates an average value based on the vicinity region information which is supplied from the vicinity region extraction section 21 and supplies the average value to the defective pixel detection section 152.

For example, as shown in FIG. 19, a target pixel CP71 is an R pixel and the R pixels in the target vicinity region, which is centered on the target pixel CP71 and is formed from nine pixels in the x direction and nine pixels in the y direction, are supplied as the vicinity region information.

Here, the width direction and the height direction in the diagram are respectively the x direction and the y direction. In the diagram, one square represents one pixel in the image and the letter which is written in the pixel is the color of the pixel.

In this case, the average value calculation section 151 calculates an average value $W_R$ for the pixel values of the R pixels in the target vicinity region using a calculation of the following equation (1).

$$W_R = \frac{1}{N}\left(\sum R - R_{max} - R_{2ndmax} - R_{min} - R_{2nd\ min}\right) \quad (1)$$

Here, in equation 1, $\Sigma R$ indicates the sum if the pixel values of the R pixels in the target vicinity region excluding the target pixel CP71, and N is a value which is acquired by subtracting five from the number of all of the R pixels which are in the target vicinity region.

In addition, $R_{max}$ and $R_{2ndmax}$ are pixel values of the R pixels which have the largest and second largest pixel values out of the R pixels in the target vicinity region excluding the target pixel CP71. Furthermore, $R_{min}$ and $R_{2ndmin}$ are pixel values of the R pixels which have the smallest and second smallest pixel values out of the R pixels in the target vicinity region excluding the target pixel CP71.

Accordingly, the average value $W_R$ is the average value of the pixel values of all of the R pixels in the target vicinity region excluding the total of five pixels of the target pixel CP71, the R pixels with the largest and second largest pixel values, and the R pixels with the smallest and second smallest pixel values. Here, the excluding of the pixels with large pixel values and the pixels with small pixel values from the calculation of the average value is in order to reduce the effect of the defective pixels in the target vicinity region.

The average value $W_R$ which is acquired in this manner indicates the average pixel value of the R pixels in the target vicinity region. Here, in the case where the target pixel is a B pixel, an average value which indicates the average pixel value of the B pixels is determined using a process which is the same as the case of the R pixel.

Figure 18:
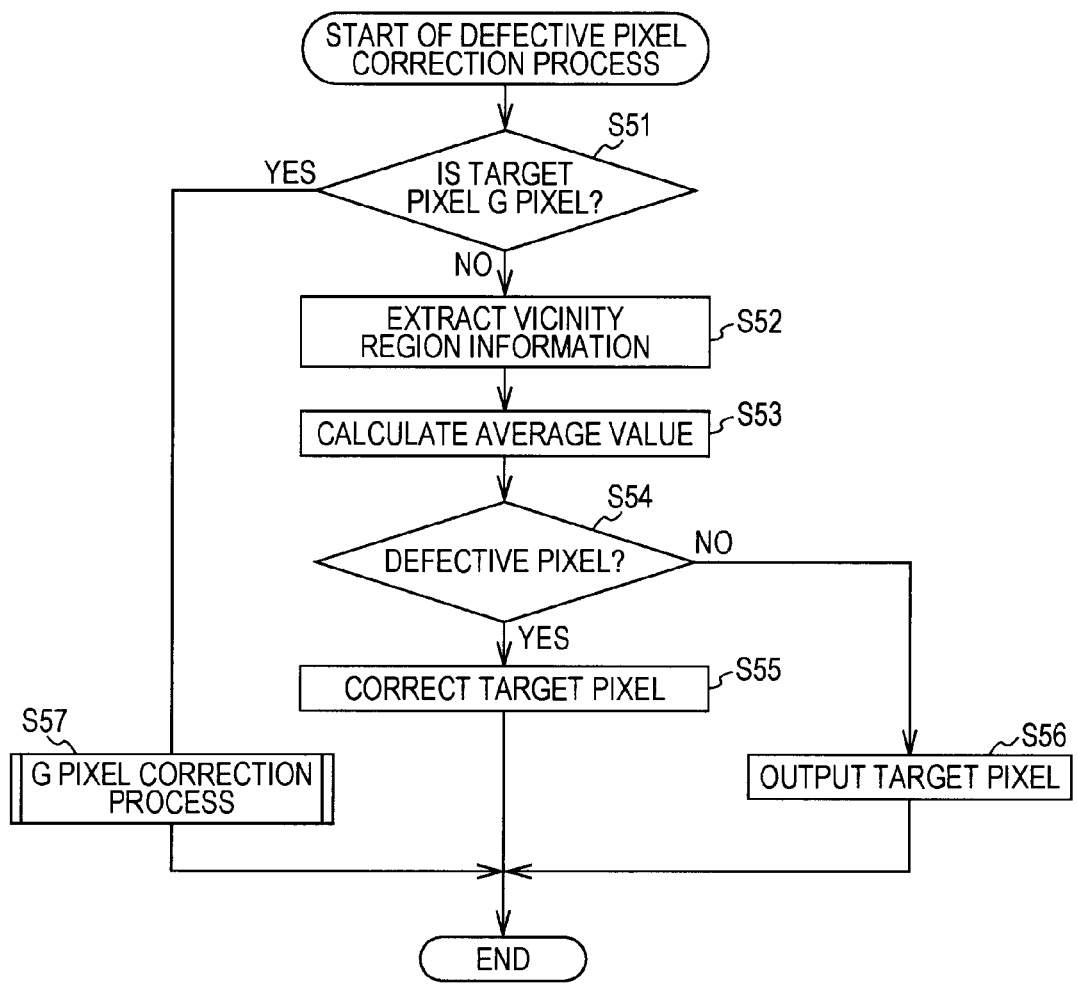
FIG. 18 is a flowchart describing a defective pixel correction process.

Returning to the flowchart of FIG. 18, in step S54, the defective pixel detection section 152 determines whether or not the target pixel is a defective pixel based on the vicinity region information from the vicinity region extraction section 21 and the average value from the average value calculation section 151.

For example, in the example shown in FIG. 19, when the pixel value of the target pixel CP71 is R', the defective pixel detection section 152 sets the target pixel as a defective pixel in a case where $|R'-W_R|$ which is the absolute value of the difference of the pixel value R' of the target pixel CP71 and the average value $W_R$ is larger than a predetermined threshold t.

That is, since the average value $W_R$ is the average pixel value of the R pixels in the target vicinity region, there is a high possibility that the target pixel CP71 is a defective pixel in a case where the pixel value of the target pixel CP71 is largely different to the average pixel value. Therefore, the defective pixel detection section 152 sets the target pixel as a defective pixel in a case where the absolute value of the difference of the pixel value of the target pixel and the average value which has been determined in step S53 is larger than the threshold t.

The defective pixel detection section 152 supplies the determination result to the defective pixel correction section 153 when it is determined whether or not the target pixel is a defective pixel.

In a case where it is determined in step S54 that the target pixel is a defective pixel, the defective pixel correction section 153 corrects the target pixel in step S55 based on the vicinity region information from the vicinity region extraction section 21 according to the determination result from the defective pixel detection section 152.

For example, the defective pixel correction section 153 calculates an average value by performing a process which is the same as step S53 and sets the average value which is calculated as the pixel value of the target pixel after correction. When the target pixel has been corrected, the defective pixel correction section 153 outputs the pixel value of the target pixel which has been corrected and the defective pixel correction process is complete.

On the other hand, in a case where it is determined in step S54 that the target pixel is not a defective pixel, the defective pixel correction section 153 outputs the pixel value of the target pixel as it is in step S56 according to the determination result from the defective pixel detection section 152. That is, the defective pixel correction section 153 outputs the pixel value of the target pixel which is acquired using the vicinity region information which is supplied from the vicinity region extraction section 21 without correction and the defective pixel correction process is complete.

In addition, in a case where it is determined in step S51 that the target pixel is a G pixel, in step S57, the image processing device 141 performs a G pixel correction process and the detection and correction of the defective pixel is performed based on the G pixels which are lined up in the texture direction. Here, the details of the G pixel correction process will be described later. When the G pixel correction process has been performed, the G pixel is output as the target pixel which has been corrected as necessary and the defective pixel correction process is complete.

As above, the image processing device 141 specifies whether or not the target pixel is a defective pixel using a different method according to whether the target pixel is an R pixel or a B pixel or whether the target pixel is a G pixel and corrects the defect of the target pixel as necessary. Due to this, an appropriate target vicinity region is extracted according to the color of the target pixel and it is possible for the detection and correction of the defective pixel to be performed using a method which is appropriate for the color of the target pixel.

[Description of G Pixel Correction Process]

Figure 20:
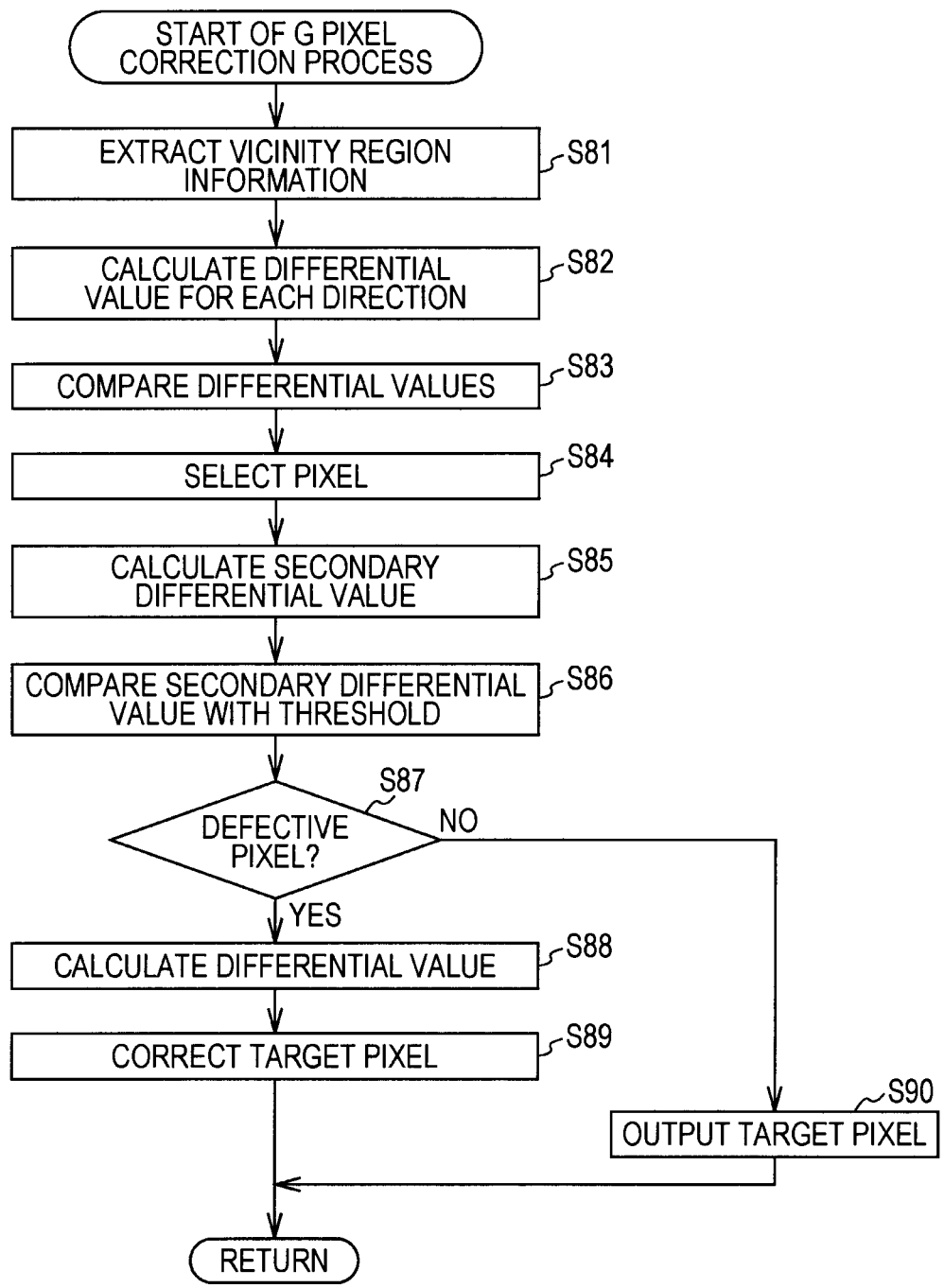
FIG. 20 is a flowchart describing a G pixel correction process.

Next, FIG. 20 is a flowchart describing the G pixel correction process which corresponds to the process of step S57 in FIG. 18.

Here, processes which are similar to the processes of step S11 to step S20 of FIG. 5 are performed in the processes of step S81 to step S90 of the G pixel correction process, the description thereof is omitted. In the processes of step S81 to step S90, the texture direction is specified and the detection and correction of the defective pixel is performed using the pixels which are lined up in the texture direction.

When the process of step S89 or step S90 has been performed and the pixel value of the target pixel has been output, the G pixel correction process is complete, and after that, the process returns to step S57 of FIG. 18 and the defective pixel correction process is complete.

In this manner, in the G pixel correction process, the detection of correction of the defective pixel is performed using a different process to the case where an R pixel or a B pixel is the target pixel.

The series of processes which are described above are able to be executed using hardware or are able to be executed using software. In a case where the series of processes which are described above are executed using software, a program which configures the software is installed from a program recording medium to a computer where specialized hardware is built in, a general personal computer or the like which is able to execute the various processes by various programs being installed, or the like.

Figure 21:
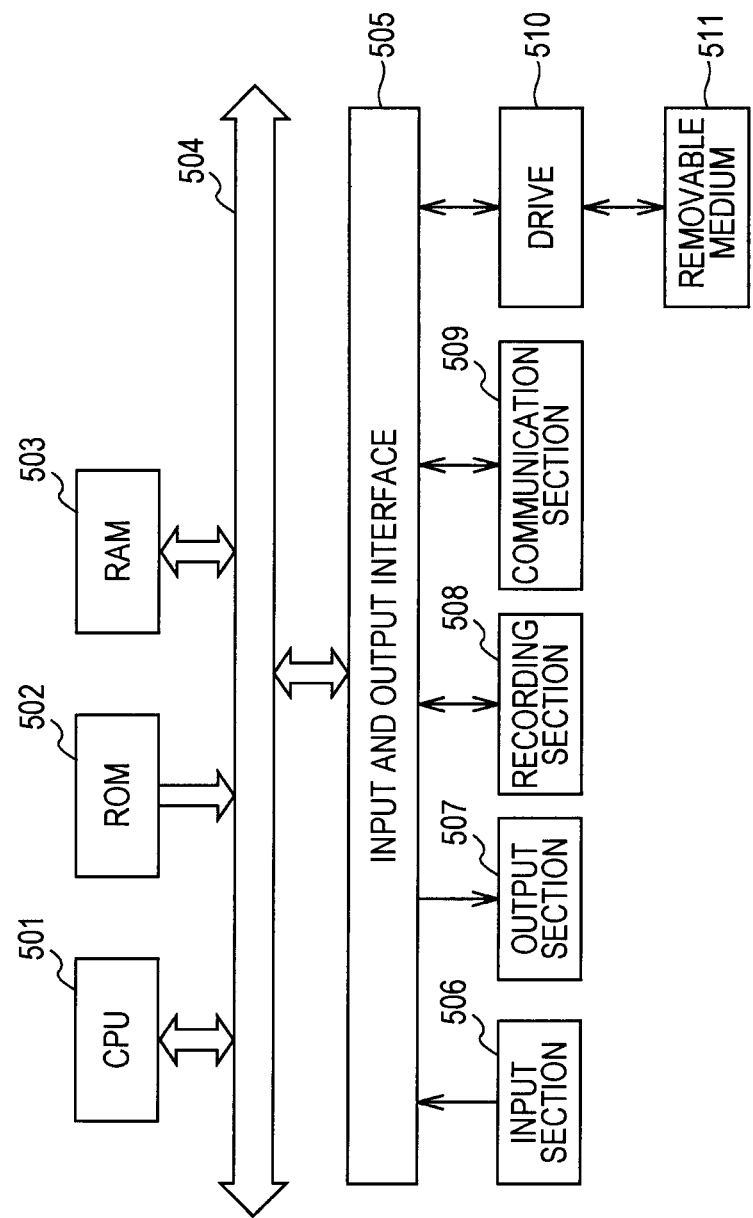
FIG. 21 is a diagram illustrating a configuration example of a computer.

FIG. 21 is a block diagram illustrating a configuration example of hardware of a computer which executes the series of processes described above using a program.

In the computer, a CPU (Central Processing Unit) 501, a ROM (Read Only Memory) 502, and a RAM (Random Access Memory) 503 are connected to each other via a bus 504.

An input/output interface 505 is also connected to the bus 504. An input section 506 which is formed from a keyboard, a mouse, a microphone, or the like, an output device 507 which is formed from a display, a speaker, or the like, a recording section 508 which is configured from a hard disk, a nonvolatile memory, or the like, a communication section 509 which is configured from a network interface or the like, and a drive 510 which drives a removable medium 511 such as a magnetic disk, an optical disc, a magneto-optical disc, a semiconductor memory, or the like are connected in the input/output interface 505.

In the computer which is configured in this manner, for example, the CPU 501 executes the series of processes described above by executing a program which is recorded in the recording section 508 by loading the program onto the RAM 503 via the input and output interface 505 and the bus 504.

The program which is executed by the computer (the CPU 501) is provided, for example, by being recorded on the removable medium 511 which is a package medium which is formed from a magnetic disk (which includes a flexible disk), an optical disc (which includes a CD-ROM (Compact Disc-Read Only Memory) or a DVD (Digital Versatile Disc) and the like), a magneto-optical disc, a semiconductor memory, or the like, or via a wired or wireless transmission medium such as a local area network, the Internet, or digital satellite broadcasting.

Then, it is possible for the program to be installed to the recording section 508 via the input and output interface 505 by the removable medium 511 being mounted in the drive 510. In addition, it is possible for the program to be received by the communication section 509 and installed in the recording section 508 via a wired or wireless transmission medium. Other than this, it is possible for the program to be installed in advance in the ROM 502 or the recording section 508.

Here, the program which is executed by the computer may be a program which is performed in a time series manner in line with the order described in the specifications or may be a program where the processing is performed in parallel or at a necessary timing such as when a request is performed.

In addition, the embodiments of the present technology are not limited to the embodiment described above but various modifications are possible within the scope which does not depart from the concept of the present technology.

Here, the present technology is able to be configured as below.

[1]

An image processing device which is provided with a determination section which determines texture direction in a vicinity region based on the vicinity region which includes a target pixel in the image, and a detection section which detects whether or not the target pixel is a defective pixel based on a plurality of pixels including the target pixel which are lined up in the texture direction in the image.

[2]

The image processing device described in [1] where the detection section is provided with a secondary differential value calculation section which calculates a secondary differential value of the pixel value of the pixel with regard to a grouping of a predetermined number of pixels including the target pixel which are lined up to be continuous in the texture direction in the image, and a comparator which determines whether the target pixel is a defective pixel based on the secondary differential values of a plurality of the groupings which are different.

[3]

The image processing device described in [2] where the comparator determines that the target pixel is a defective pixel in a case where each secondary differential value of the plurality of the groupings which are different is larger than a predetermined threshold.

[4]

The image processing device described in any of [1] to [3] where a defective pixel correction section, which corrects the target pixel based on the pixels in the vicinity of the target pixel which are the same color as the target pixel and are lined up in the texture direction, is further provided.

[5]

The image processing device described in [4] where the defective pixel correction section is provided with a differential value calculation section which calculates differential values for two pixels which are adjacent in a first direction which is parallel to the texture direction with regard to the target pixel and differential values for two pixels which are adjacent in a second direction which is opposite to the first direction with regard to the target pixel, and a correction value calculation section which sets a target pixel after correction by carrying out a weighted average for two pixels which are adjacent in a direction where the differential value is smaller out of the first direction and the second direction with regard to the target pixel.

[6]

The image processing device described in any of [1] to [5] where the determination section calculates the differential value of a direction in the vicinity region based on the differential value between the pixels which are lined up in the same direction in the vicinity region and the direction where the differential value is the smallest out of a plurality of directions is set as the texture direction.

Third Embodiment

[Erroneous Correction]

However, when a pixel which is not defective may be incorrectly detected as a defective pixel and corrected due to automatic defect correction with regard to the pixel. When erroneous correction is performed in this manner, omission of texture, false color, or the like are generated in the image.

For example, as a defective pixel correction method, a technology is proposed where the generation of the omission of texture and false color due to the correction of a defective pixel is suppressed by performing determination of the texture direction in a region in the vicinity of the target pixel and performing detection and correction of the defective pixel based on the determination result (for example, refer to Japanese Unexamined Patent Application Publication No. 2009-290653 and Japanese Patent No. 4343988).

However, even with the defective pixel correction method such as this, there are cases where the acquisition of a high-quality image due to pixel correction is difficult.

That is, erroneous correction of the pixels is generated when correcting the defective pixel in a region where correct determination of the texture direction is difficult, for example, in a region with a texture with a high frequency, a region where the pixel value is saturated, and the like, and the quality of the image which is acquired due to correction deteriorates.

In addition, in the defective pixel correction method described above, a process is performed for each color component (for example, for each of R, G, and B if there is in a Bayer arrangement) the detection and correction of the defective pixel are performed using the pixels which have the same color component. As a result, the balance of each color breaks down due to correction and false color is generated.

[Configuration Example of Image Processing Device]

Therefore, erroneous correction may be prevented by using a color component which is different to the color component of the target pixel. In a case such as this, an image processing device which performs detection and correction of defective pixels in the image is configured, for example, as shown in FIG. 22.

Figure 22:
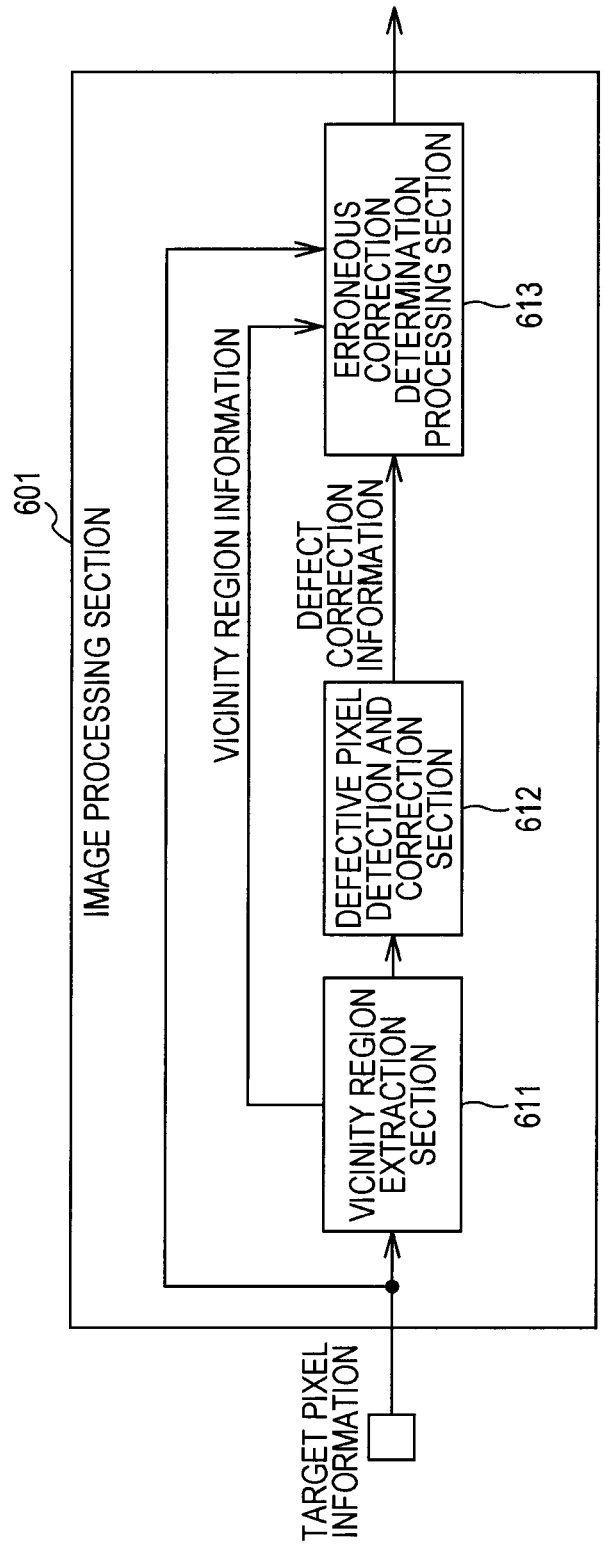
FIG. 22 is a diagram illustrating another configuration example of an image processing device.

An image processing device 601 in FIG. 22 is configured from a vicinity region extraction section 611, a defective pixel detection and correction section 612, and an erroneous correction determination processing section 613. The image processing device 601 has target pixel information which includes the pixel values, the positions, color component information, or the like of the pixels which are in the vicinity of the pixel which is a target in the image (referred to below as a target pixel) as input, and outputs the target pixel where defects have been corrected as necessary.

For example, the target pixel information which is formed from the pixel values of the plurality of pixels in the vicinity of the target pixel, the position of each of the pixels, and color component information which indicates the color component of each of the pixels is supplied in the vicinity region extraction section 611. The vicinity region extraction section 611 extracts information on the vicinity region formed from several pixels in the vicinity of the target pixel in the image which includes the target pixel from the target pixel information which has been supplied, and supplies the information to the defective pixel detection and correction section 612 and the erroneous correction determination processing section 613.

The defective pixel detection and correction section 612 detects whether or not the target pixel is a defective pixel based on the vicinity region information from the vicinity region extraction section 611, corrects the target pixel which is set as a defective pixel as necessary, and supplies defect correction information which relates to the target pixel after correction to the erroneous correction detection section 613. Here, the target pixel which has been corrected is appropriately referred to below as a corrected target pixel.

The erroneous correction determination processing section 613 performs target pixel erroneous correction determination based on the vicinity region information from the vicinity region extraction section 611 and the defect correction information from the defective pixel detection and correction section 612, and outputs the target pixel or the corrected target pixel according to the specification result.

[Configuration Example of Defective Pixel Detection and Correction Section]

Figure 23:
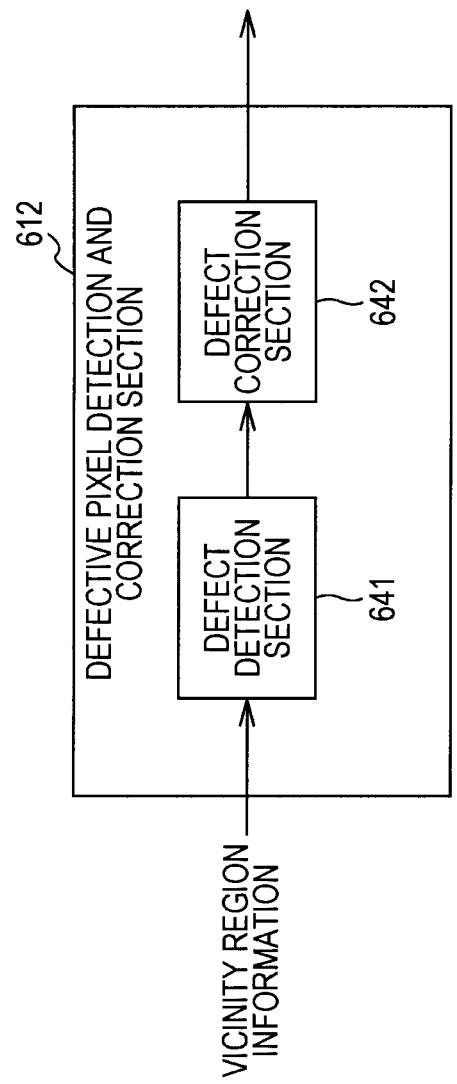
FIG. 23 is a diagram illustrating a configuration example of a defective pixel detection and correction section.

In addition, in more detail, the defective pixel detection and correction section 612 in FIG. 22 is configured as shown in FIG. 23. That is, the defective pixel detection and correction section 612 is configured from a defect detection section 641 and a defect correction section 642.

The defect detection section 641 determines whether or not the target pixel is a defective pixel based on the vicinity region information from the vicinity region extraction section 611 and supplies the determination result and the vicinity region information to the defect correction section 642. The defect correction section 642 corrects the target pixel based on the determination result and the vicinity region information from the defect detection section 641 and supplies the defect correction information which includes the corrected target pixel which is acquired as a result to the erroneous detection determination processing section 613.

[Configuration Example of Erroneous Detection Determination Processing Section]

Figure 24:
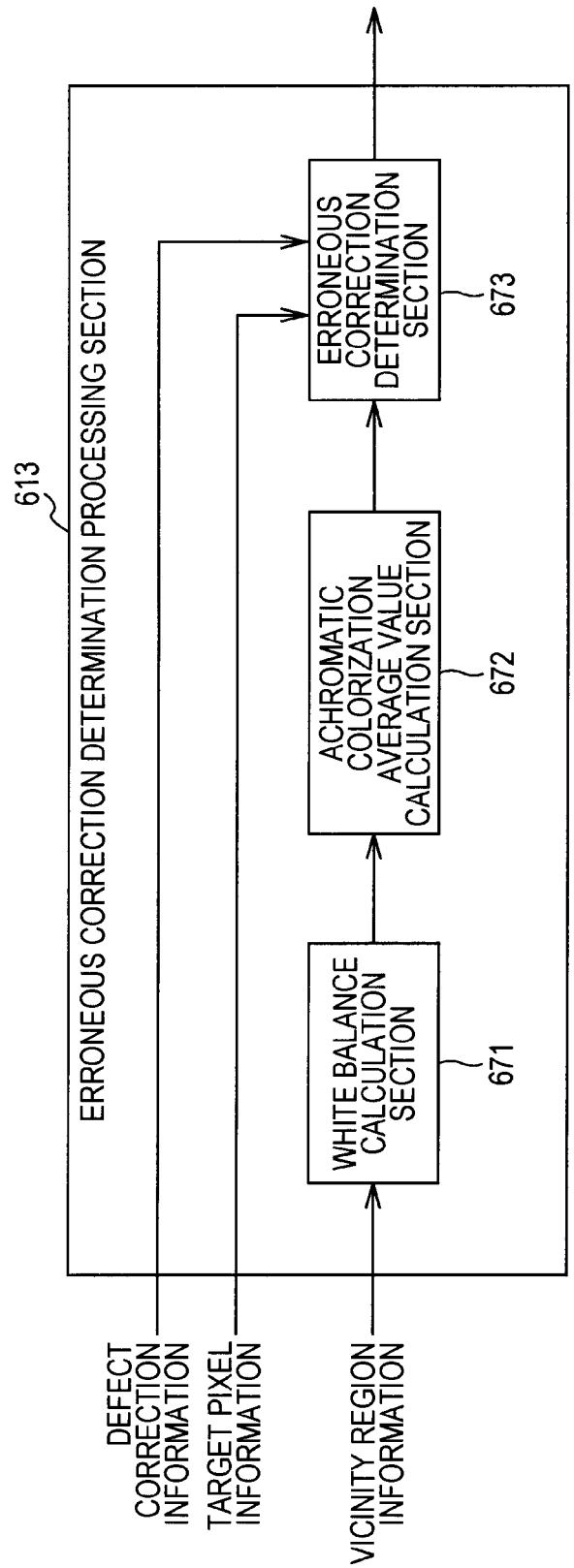
FIG. 24 is a diagram illustrating a configuration example of an erroneous correction determination section.

Furthermore, in more detail, for example, the erroneous detection determination processing section 613 of FIG. 22 is configured as shown in FIG. 24. That is, the erroneous detection determination processing section 613 is configured from a white balance calculation section 671, an achromatic colorization average value calculation section 672, and an erroneous correction determination section 673.

The white balance calculation section 671 calculates white balance based on the vicinity region information from the vicinity region extraction section 611 and supplies the white balance which is acquired and the vicinity region information to the achromatic colorization average value calculation section 672.

The achromatic colorization average value calculation section 672 calculates an average value of the pixel values of the pixels where achromatic colorization has been carried out in the vicinity of the target pixel as an achromatic colorization average value based on the white balance and the vicinity region information, which are supplied from the white balance calculation section 671 and supplies the achromatic colorization average value to the erroneous correction determination section 673.

The erroneous correction determination section 673 determines whether or not the correction with regard to the target pixel is erroneous correction based on the achromatic colorization average value from the achromatic colorization average value calculation section 672, the target pixel information which has been supplied, and the defect correction information which is supplied from the defect correction section 642 of the defective pixel detection and correction section 612. In addition, the erroneous correction determination section 673 outputs either of the target pixel which is included in the target pixel information or the corrected target pixel which is included in the defect correction information as the final target pixel according to the erroneous correction determination result and the like.

[Description of Defective Pixel Correction Process]

Next, the defect pixel correction process which is performed using the image processing device 601 will be described with reference to the flowchart of FIG. 25.

The defective pixel correction process is performed for each pixel in the image which is the processing target where performing of the detection and correction of a defective pixel is to be attempted. Here, below, the image which is the processing target is formed from pixels of each color of R, G, and B and the pixels of each color are lined up in a Bayer arrangement. In addition, below, the pixels of each color of R, G, and B are referred to respectively as R pixels, G pixels, and B pixels.

In step S121, the vicinity region extraction section 611 extracts the vicinity region information from the target pixel information which has been input, and supplies the vicinity region information to the defect detection section 641 of the defective pixel detection and correction section 612 and the white balance calculation section 671 of the erroneous correction determination processing section 613.

For example, in a case where the target pixel is a G pixel, the vicinity region extraction section 611 extracts each pixel which is included in a rectangular region from the rectangular region which is formed from nine pixels in the horizontal direction and nine pixels in the vertical direction which are centered on the target pixel in the image and sets as the vicinity region information.

In step S122, the defect detection section 641 performs the defect detection with regard to the target pixel based on the vicinity region information which is supplied from the vicinity region extraction section 611.

For example, the defect detection region 641 specifies the texture direction in the region in the vicinity of the target pixel based on the vicinity region information, and extracts a pixel row including the target pixel which is formed from pixels with the same color as the target pixel which are lined up in the texture direction. Then, the defect detection section 641 specifies whether or not the target pixel is a defective pixel by comparing the pixels in the pixel row which has been extracted and the target pixel.

In addition, for example, the defect detection section 641 determines a weighted average value of the pixel values of each of the pixels with the same color as the target pixel which are in the vicinity of the target pixel by weighting according to the distance from the target pixel, and specifies whether the target pixel is a defective pixel by comparing the weighted average value which has been acquired and the target pixel.

In step S123, the defect detection section 641 determines whether or not the target pixel is a defective pixel, and supplies the determination result and the vicinity information to the defect detection 642. For example, in a case where it is determined in step S122 that the target pixel is a defective pixel, it is determined that the target pixel is a defective pixel in step S123.

In a case where it is determined in step S123 that the target pixel is a defective pixel, in step S124, the defect correction section 642 performs defect correction on the target pixel based on the determination result and the vicinity region information from the defect detection section 641.

That is, the defect correction section 642 determines the corrected target pixel based on the pixels in the vicinity of the target pixel and supplies the defect correction information which includes the corrected target pixel which is acquired as a result to the erroneous correction determination section 673 of the erroneous correction determination processing section 613. Specifically, for example, the defect correction section 642 sets the average value of the pixel values of the pixels with the same color as the target pixel which are in the target vicinity region as the pixel value of the corrected target pixel.

In step S125, the white balance calculation section 671 calculates the white balance based on the vicinity region information from the vicinity region extraction section 611 and supplies the white balance which has been acquired and the vicinity region information to the achromatic colorization average value calculation section 672.

Figures 26, 27:
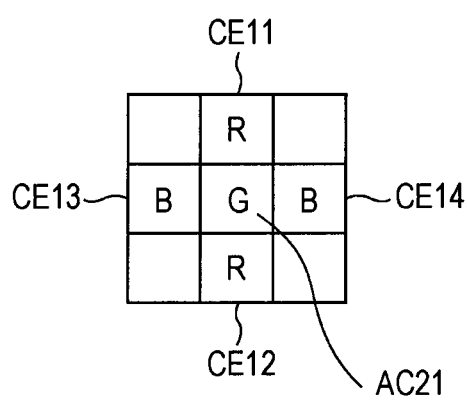
FIG. 26 is a diagram describing calculation of white balance.
FIG. 27 is a diagram describing calculation of an achromatic colorization average value.

For example, information on the region of nine pixels by nine pixels (referred to below as the target vicinity region) which is centered on a target pixel AC11 shown in FIG. 26 is supplied as the vicinity region information.

Here, in FIG. 26, one square represents one pixel and the letters "R", "G", and "B" in the squares respectively indicate the R pixel, the G pixel, and the B pixel, and the target pixel AC11 is a G pixel in this example.

The white balance calculation section 671 calculates the average value of the pixel values of the pixels of the color for each color component of the R pixel, the G pixel, and the B pixel in the target vicinity region which is formed from a total of 81 pixel with nine pixels in the height direction and nine pixels in the width direction in the diagram.

Specifically, it is assumed that there are $N_R$ of the R pixels, $N_G$ of the G pixels, and $N_B$ of the B pixels in the target vicinity region which is indicated in the vicinity region information. In addition, it is assumed that the pixel value of $R_i$ (here, i=1 to $N_R$) in the order of the R pixels is $R_i$, the pixel value of $G_i$ (here, i=1 to $N_G$) in the order of the G pixels is $G_i$, and the pixel value of $B_i$ (here, i=1 to $N_B$) in the order of the B pixels is $B_i$.

At this time, the white balance calculation section 671 determines an average value aveR of the pixel values of the R pixels in the target vicinity region by calculating equation (2).

$$aveR = \frac{1}{N_R} \sum_{i=1}^{N_R} R_i \qquad (2)$$

In the same manner, the white balance calculation section 671 determines an average value aveG of the pixel values of the G pixels in the target vicinity region by calculating equation (3) and determines an average value aveB of the pixel values of the B pixels in the target vicinity region by calculating equation (4).

$$aveG = \frac{1}{N_G} \sum_{i=1}^{N_G} G_i \qquad (3)$$

$$aveB = \frac{1}{N_B} \sum_{i=1}^{N_B} B_i \qquad (4)$$

Furthermore, the white balance calculation section 671 determines fractions of each of the color components which has been acquired in this manner as the white balance. Specifically, for example, a fraction (aveG/aveR) of the average value aveR of the R component and the average value aveG of the G component and a fraction (aveG/aveB) of the average value aveB of the B component and the average value aveG of the G component are determined as the white balance of the target vicinity region.

Figure 25:
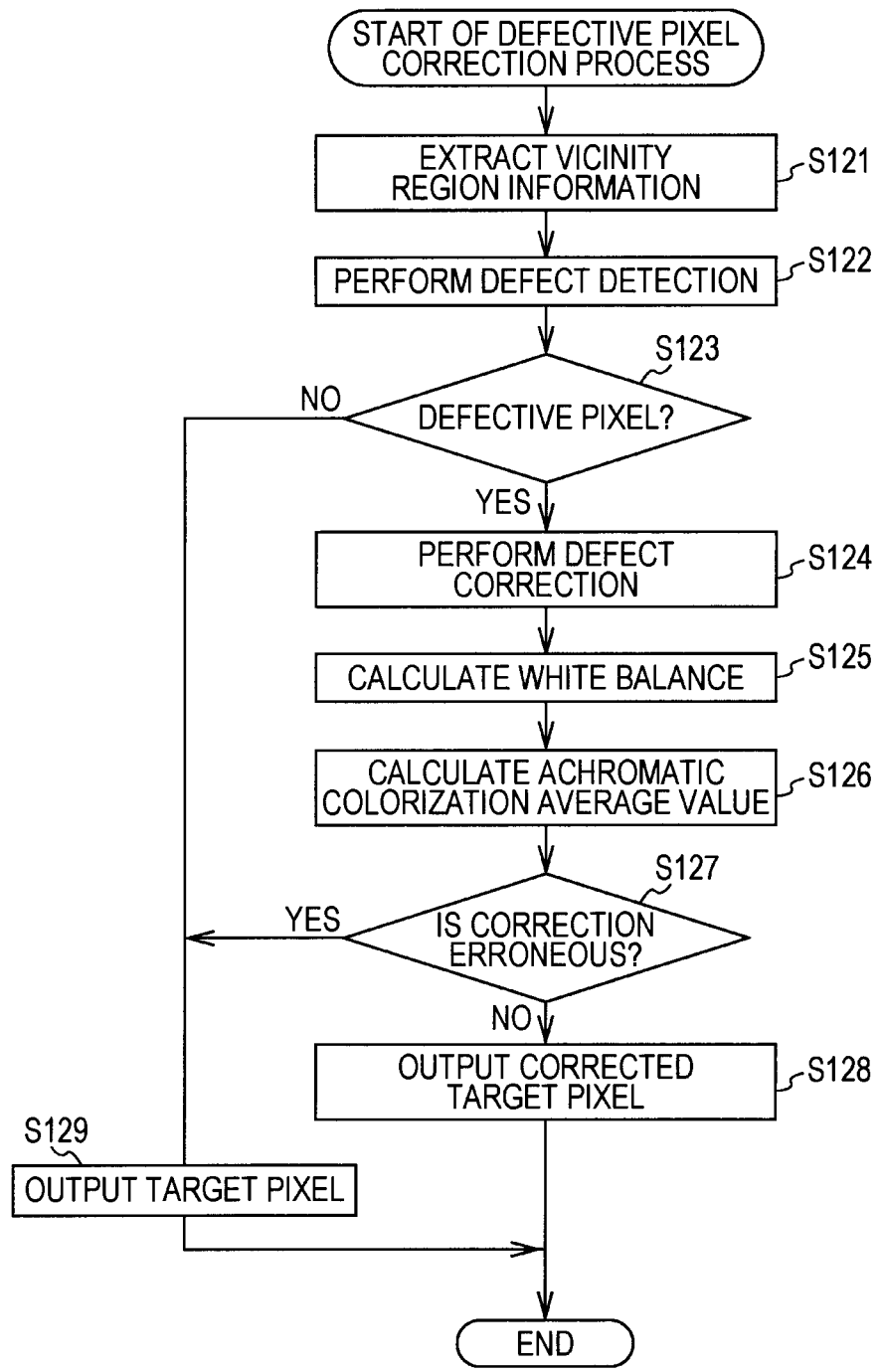
FIG. 25 is a flowchart describing a defective pixel detection and correction section.

Returning to the flowchart of FIG. 25, in step S125, the process proceeds to step S126 when the white balance is calculated.

In step S126, the achromatic colorization average value calculation section 672 calculates an achromatic colorization average value based on the white balance and the vicinity region information which are supplied from the white balance calculation section 671 and supplies the achromatic colorization average value to the erroneous correction determination section 673.

For example, as shown in FIG. 27, the achromatic colorization average value calculation section 672 carries out achromatic colorization on a pixel CE11 to a pixel CE14 which are adjacent to a target pixel AC21 up, down, left and right in the diagram, and calculates the average value of the pixel value of the pixels where achromatic colorization has been carried out as an achromatic colorization average value P.

Here, in FIG. 27, one square represents one pixel and the letters "R", "G", and "B" in the squares respectively indicate the R pixel, the G pixel, and the B pixel. In this example, the target pixel AC21 is a G pixel, the pixel CE11 and the pixel CE12 are R pixels, and the pixel CE13 and the pixel CE14 are B pixels.

The pixel CE11 to the pixel CE14 are the pixels in the vicinity of the target pixel which are in the target vicinity region. In addition, for example, the pixel values of the pixel CE11 and the pixel CE12 are respectively $R_1$ and $R_2$ and the pixel values of the pixel CE13 and the pixel CE14 are respectively $B_1$ and $B_2$. In this case, the achromatic colorization average value calculation section 672 calculates the achromatic colorization average value P by calculating equation (5).

$$P = \left\{ \frac{aveG}{aveB}(B_1 + B_2) + \frac{aveG}{aveR}(R_1 + R_2) \right\} / 4 \quad (5)$$

That is, the achromatic colorization average value calculation section 672 carries out achromatic colorization on the pixel CE11 by, for example, multiplying the pixel value $R_1$ of the pixel CE11 with the white balance (aveG/aveR). That is, the pixel value of the pixel CE11 which is the R component is matched up with the G component.

The achromatic colorization average value calculation section 672 sets the average value of the pixel values of the pixel where achromatic colorization has been carried out as the achromatic colorization average value P when achromatic colorization is carried out on the pixels in the vicinity of the target pixel with the color components which are different to the target pixel. In other words, the average value of the pixel values of the pixels in the vicinity of the target pixel with the color components which are different to the target pixel is determined by the color balance of R, G, and B being matched up.

Here, in a case where the target pixel is an R pixel, the achromatic colorization average value calculation section 672 calculates the achromatic colorization average value P by calculating equation (6).

$$P = \frac{aveR}{aveG}(G_1 + G_2 + G_3 + G_4)/4 \quad (6)$$

Here, in equation (6), $G_1$ to $G_4$ indicate the pixel values of the G pixels which are adjacent to the R pixel, which is the target pixel in the image which is the processing target, up, down, left and right in the diagram. Accordingly, in equation (6), the white balance (aveR/aveG), in more detail, the inverse of the white balance (aveG/aveR) which is determined in step S125, is multiplied to the average value of the pixel values of the G pixels which are up, down, left, and right of the target pixel and set as the achromatic colorization average value P.

That is, even in a case where the target pixel is an R pixel, achromatic colorization is carried out on the pixels in the vicinity of the target pixel and the average value of the pixel values of the pixels where achromatic colorization has been carried out is set as the achromatic colorization average value P.

In addition, the achromatic colorization average value P is calculated using a calculation which is similar to equation (6) also in the case where the target pixel is a B pixel. That is, the white balance (aveB/aveG) is multiplied with the average value of the pixel values of the G pixels which are up, down, left, and right of the target pixel and set as the achromatic colorization average value P.

Figure 28:
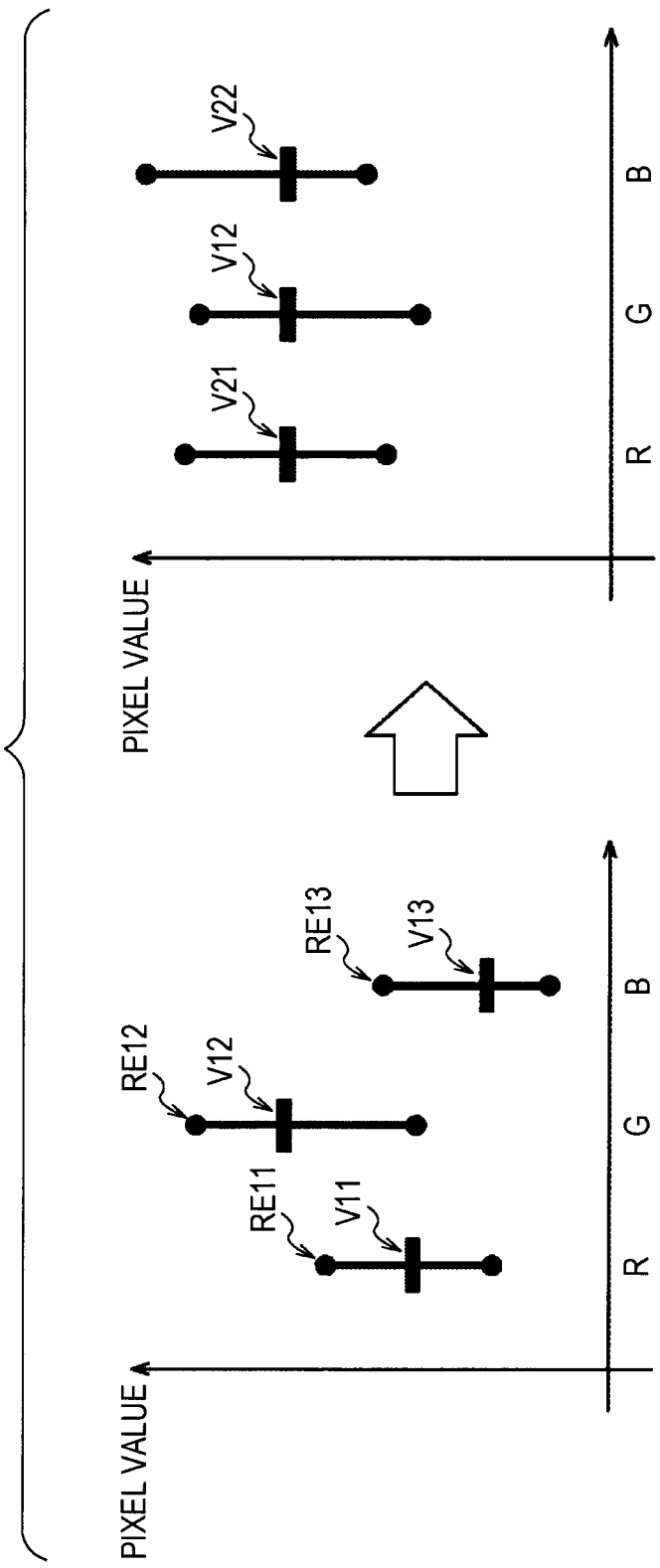
FIG. 28 is a diagram describing achromatic colorization of a pixel.

For example, as shown in FIG. 28, the average values of the pixel value of the pixels of each color component in the target vicinity region are often different. Here, in FIG. 28, the horizontal axis indicates each color component and the vertical axis indicates the pixels values of each of the pixels.

In the target vicinity region, it is assumed that the pixel values of the pixels with each color component of the R pixel, the G pixel, and the B pixel are dispersed in the range which is linear in the height direction shown respectively by the arrow RE11 to the arrow RE13. In addition, it is assumed that the average values of the pixels with each color component is indicated by the positions (pixel values) shown by the arrow V11 to the arrow V13. In this case, for example, it is assumed that the position (pixel value) which is indicated by the arrow V11 is the average value aveR of the pixel value of the R pixels.

In addition, when achromatic colorization is carried out by the white balance (aveG/aveR) being multiplied by the average value aveR of the R pixels, the average value of the pixel values of the R pixels after achromatic colorization is the position which is indicated by the arrow V21. In the same manner, when achromatic colorization is carried out by the white balance (aveG/aveB) being multiplied by the average value aveB of the B pixels, the average value of the pixel values of the B pixels after achromatic colorization is the position which is indicated by the arrow V22.

When the average values of the pixels values of each color component match up with the G color component by the average value aveR and the average value aveB being multiplied with the white balance in this manner, the average values of the pixel values of the pixels with each color component of R, G, and B are the same value as shown in the right side in the diagram.

When the average values of the pixel values of the pixels after achromatic colorization with the colors which are different to the target pixel are determined after the color components of RGB are matched up using the achromatic colorization, the achromatic colorization average value P, which is equivalent to the average pixel value of the pixels with the same color as the target pixel which are in the target vicinity region, is acquired.

In step S127, the erroneous correction determination section 673 determines whether or not the correction with regard to the target pixel is an erroneous correction based on the achromatic colorization average value P from the achromatic colorization average value calculation section 672, the target pixel information which has been supplied, and the defect correction information from the defect correction section 642.

For example, the pixel value of the target pixel which is indicated by the target pixel information, that is, the pixel value before the correction of the target pixel is $G_{org}$ and the pixel value after the correction of the target pixel which is indicated by the defect correction information, that is, the pixel value of the corrected target pixel which is calculated by the defect correction section 642 is $G_{cor}$.

In this case, the erroneous correction determination section 673 determines that there is erroneous correction when the absolute value of the difference of the pixel value before correction $G_{org}$ and the achromatic colorization average value P is equal to or less than the absolute value of the difference of the pixel value after correction $G_{cor}$ and the achromatic colorization average value P, that is, $|G_{org}-P| \leq |G_{cor}-P|$.

For example, the achromatic colorization average value P is equivalent to the average pixel value (brightness) of the pixels with the same color as the target pixel which are in the target vicinity region. Accordingly, in a case where $|G_{org}-P| \leq |G_{cor}-P|$, that is, in a case where the pixel value before correction $G_{org}$ is closer than the pixel value after correction $G_{cor}$ to the achromatic colorization average value P, the original target pixel is closer to the brightness of the pixels in the surroundings than the corrected target pixel. In a case such as this, there is a high possibility that the pixel value of the original target pixel is closer to the pixel value that the target pixel is to be taking than the pixel value of the corrected target pixel.

Therefore, the erroneous correction determination section 673 sets the correction which has been performed with regard to the target pixel as erroneous correction in a case where $|G_{org}-P| \leq |G_{cor}-P|$ and set the correction which has been performed with regard to the target pixel as appropriate correction in a case where $|G_{org}-P| > |G_{cor}-P|$.

In a case where it is determined in step S127 that the correction with regard to the target pixel is not erroneous correction, that is, is appropriate correction, the erroneous correction determination section 673 outputs the pixel value of the corrected target pixel which is supplied from the defect correction section 642 in step S128.

That is, the pixel value of the target pixel which has been corrected is output as the pixel value of the final target pixel. When the corrected target pixel is output, the defective pixel correction process is complete.

In addition, in a case where it is determined in step S123 that the target pixel is not a defective pixel or a case where it is determined in step S127 that the correction with regard to the target pixel is erroneous correction, the process of step S129 is performed.

That is, in step S129, the erroneous correction determination section 673 outputs the pixel value of the target pixel, which is included in the target pixel information which has been supplied, as the pixel value of the final target pixel and the defective pixel correction process is complete. That is, the pixel value of the target pixel is output as it is without being corrected.

In this manner, the image processing device 601 determines whether or not the correction with regard to the target pixel is erroneous correction with regard to the corrected target pixel which is acquired by correcting the defective pixel by comparing the difference of the target pixel before correction and the achromatic colorization average value and the difference of the corrected target pixel and the achromatic colorization average value. Then, the image processing device 601 outputs either of the target pixel before correction or the target pixel after correction as the final target pixel according to the determination result.

In this manner, it is possible to simply detect defective pixels with a high degree of accuracy and to acquire a higher quality image by comparing the average value of the pixel values of the pixels in the vicinity of the target pixel where achromatic colorization has been carried out and the pixel value of the target pixel after correction.

That is, from the detection of the erroneous correction of the target pixel being substantially the same as determining if the detection result of the defective pixel is erroneous, it is possible that the detection accuracy of defective pixels may be able to be simply improved by the image processing device 601. In addition, it is possible to prevent a breakdown of the balance of each of the color components and to suppress the generation of false color by performing detection of erroneous correction and outputting the target pixel before correction or after correction according to the detection result. Due to this, it is possible to acquire a higher quality image.

In particular, in the image processing device 601, since there is only an evaluation by the pixel value of the target pixel after correction and the achromatic colorization average value being compared, there is no achromatic colorization of a portion of the image where there originally is color. In addition, since the evaluation of the erroneous correction is performed by referencing the pixels of different colors which are adjacent, it is possible to easily prevent erroneous correction where the sampling interval is shortened and the texture with high frequency is lost rather than the referencing of the same color components.

MODIFIED EXAMPLE 4

[Erroneous Correction Determination]

Here, above, for example, as shown in FIG. 27, there is a description with regard to an example where the achromatic colorization average value P is calculated using four pixels which were adjacent to the target pixel up, down, left, and right, but the achromatic colorization average value P may be calculated in any manner as long as the calculation uses the pixel which are in the vicinity of the target pixel.

For example, in a case where a target pixel AC31 is a G pixel as shown in FIG. 29, the achromatic colorization average value P may be calculated using the R pixels and the B pixels which are in the rectangular region formed from five pixels up× five pixels across which are centered on the target pixel AC31.

Here, in FIG. 29, one square represents one pixel and the letters "R", "G", and "B" in the squares respectively indicate the R pixel, the G pixel, and the B pixel.

In this example, six of the R pixels and six of the B pixels are included in the rectangular region formed from five pixels up× five pixels across which are centered on the target pixel AC31.

Here, the six R pixels in the rectangular region formed from five pixels×five pixels which are centered on the target pixel AC31 respectively are set as $R_1$ to $R_6$ and the six B pixels in the rectangular region formed from five pixels by five pixels which are centered on the target pixel AC31 respectively are set as $B_1$ to $B_6$. In addition, the pixel values of the pixels $R_i$ (here, i=1 to 6) is set as $R_i$ and the pixel values of the pixels $B_i$ (here, i=1 to 6) is set as $B_i$.

In this case, the achromatic colorization average value calculation section 672 calculates the achromatic colorization average value P with regard to the target pixel AC31 by calculating equation (7).

$$P = \left\{ \frac{aveG}{aveB} \sum_i B_i + \frac{aveG}{aveR} \sum_i R_i \right\} / 12 \quad (7)$$

That is, in equation (7), the average value of the B pixels which are multiplied by the white balance (aveG/aveB) and the R pixels which are multiplied by the white balance (aveG/aveR) is calculated as the achromatic colorization average value P.

Then, the erroneous correction determination section 673 sets as erroneous correction in the case of $|G_{org}-P| \leq |G_{cor}-P|$ and sets as appropriate correction in the case of $|G_{org}-P| > |G_{cor}-P|$. That is, if $|G_{org}-P| \leq |G_{cor}-P|$ the pixel value $G_{org}$, that is, the target pixel before correction is output as it is, and if $|G_{org}-P| > |G_{cor}-P|$ the pixel value $G_{cor}$, that is, the corrected target pixel is output.

In the example shown in FIG. 29, since the achromatic colorization average value P is calculated using more pixels compared to the example shown in FIG. 27, it is possible to perform the erroneous correction determination with a high degree of accuracy even if the pixel which is adjacent to the target pixel is a defective pixel.

For example, in a case where the pixel which is used in the calculation of the achromatic colorization average value P is a defective pixel, there is a possibility that an appropriate value may not be acquired as the achromatic colorization average value P. However, if the number of pixels which are used in the calculation of the achromatic colorization average value P is large, even if there is a defective pixel among these pixels, it is possible to acquire an appropriate achromatic colorization average value P since the level of contribution with regard to the calculation of the achromatic colorization average value P of the pixels value of the defective pixel is low.

In the same manner, in a case where the achromatic colorization average value P is calculated using the pixels in the rectangular region of 5×5 pixels which are centered on the target pixel, when, for example, the target pixel is an R pixel, achromatic colorization is carried out on the G pixels and the B pixels in the rectangular region and the average value of each of the pixels where achromatic colorization has been carried out is set as the achromatic colorization average value P.

MODIFIED EXAMPLE 5

[Erroneous Correction Determination]

Furthermore, an example has been described above where each of the color components of RGB in the image is lined up in a Bayer arrangement, but for example, as shown in FIG. 30, other than the R pixel, the G pixel, and the B pixel in the image, furthermore, a pixel which is transparent (white) may be disposed (referred to below as a W pixel). Here, in FIG. 30, one square represents one pixel and the letters "R", "G", "B", and "W" in the squares respectively indicate the R pixel, the G pixel, the B pixel, and the W pixel.

In this example, a rectangular region formed from nine pixels up and nine pixels across as shown in FIG. 30 in the diagram is the target vicinity region. In this case, the white balance calculation section 671 calculates the average values of the pixels values of the pixels with colors for each color component of the R pixel, the G pixel, the B pixel, and the W pixel in the target vicinity region as the average value aveR, the average value aveG, the average value aveB, and the average value aveW.

Then, the white balance calculation section 671 calculates the fractions of the average value aveW with the average values of the other color components with the W pixel as a reference, that is, aveW/aveR, aveW/aveG, and aveW/aveB.

In addition, the achromatic colorization average value calculation section 672 calculates the achromatic colorization average value P using the white balances aveW/aveR, aveW/aveG, and aveW/aveB which have been determined in this manner. That is, the average value of the pixels with the colors which are different to the target pixel where achromatic colorization has been carried out is set as the achromatic colorization average value P.

Specifically, for example, in a case where the target pixel is an R pixel, the achromatic colorization average value calculation section 672 calculates the achromatic colorization average value P by calculating equation (8).

$$P = \frac{aveR}{aveW}(W_1 + W_2 + W_3 + W_4)/4 \quad (8)$$

Here, in equation (8), $W_1$ to $W_4$ indicate the pixel values of the W pixels which are adjacent to the R pixel, which is the target pixel in the image which is the processing target, up, down, left and right in the diagram. Accordingly, in equation (8), the inverse of the white balance (aveW/aveR) is multiplied to the average value of the pixel values of the W pixels which are up, down, left, and right of the target pixel and set as the achromatic colorization average value P.

Fourth Embodiment

[Configuration Example of Image Processing Device]

Furthermore, the defect detection and the defect correction of the target pixel which is performed at the earlier stage of the erroneous correction determination processing section 613 may be performed in any manner in a case where erroneous correction determination is performed.

For example, as described in the first embodiment, the detection of defective pixels may be performed based on the secondary differential values which are calculated from the pixels which are lined up in the texture direction. In a case such as this, an image processing device which performed detection and correction of the defective pixel in the image is, for example, configured as shown in FIG. 31.

Figure 31:
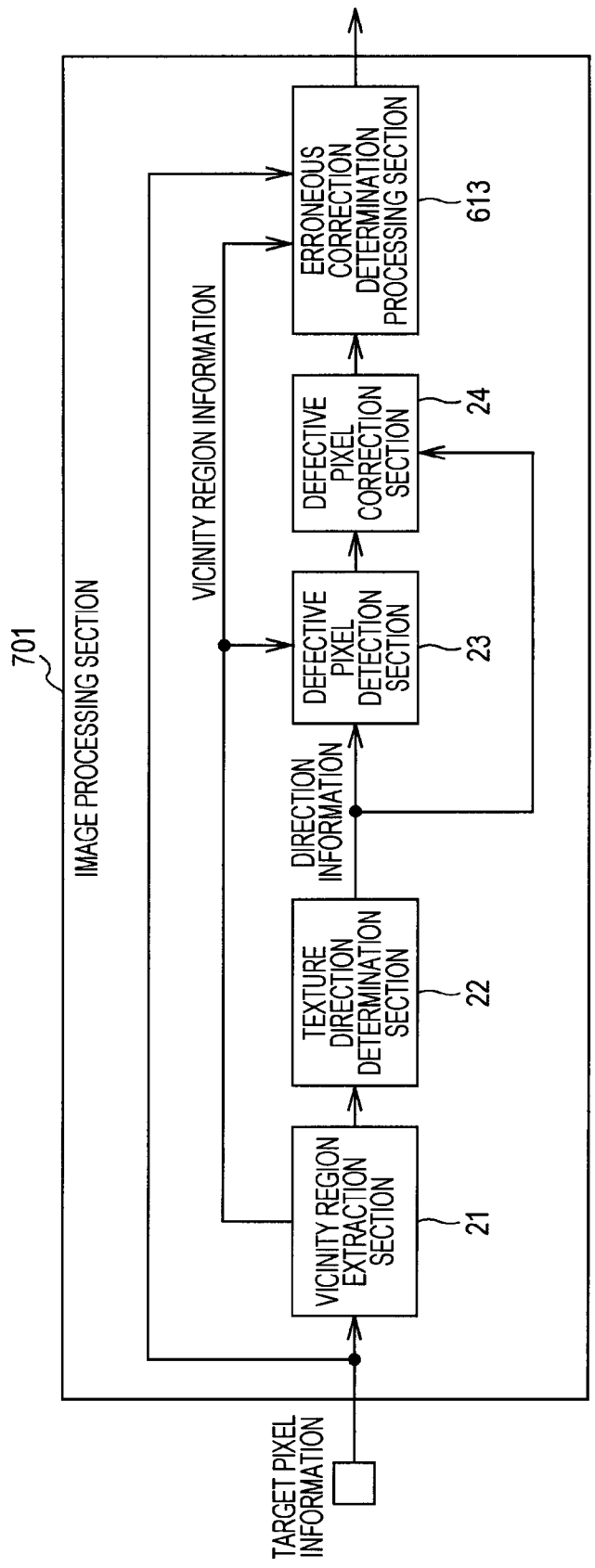
FIG. 31 is a diagram illustrating another configuration example of an image processing device.

An image processing device 701 in FIG. 31 is configured from the vicinity region extraction section 21, the texture direction determination section 22, the defective pixel detection section 23, the defective pixel correction section 24, and the erroneous correction determination processing section 613. Here, in FIG. 31, the same reference numeral is attached to the portions which correspond to the case of FIG. 1 or FIG. 22 and the description thereof is appropriately omitted.

In the image processing device 701 in FIG. 31, the erroneous correction determination processing section 613 is provided at a later stage of the defective pixel correction section 24 and the erroneous correction determination processing section 613 is configured as shown in FIG. 24. Then, in the white balance calculation section 671 of the erroneous correction determination processing section 613, the vicinity region information which is acquired by the vicinity region extraction section 21 is supplied.

In addition, in the erroneous correction determination section 673 of the erroneous correction determination processing section 613, the target pixel information which is input into the image processing device 701 and the pixel value of the target pixel after correction (referred to below as the corrected target pixel) which is supplied from the correction value calculation section 112 of the defective pixel correction section 24 are supplied.

[Description of Defective Pixel Correction Process]

Figure 32:
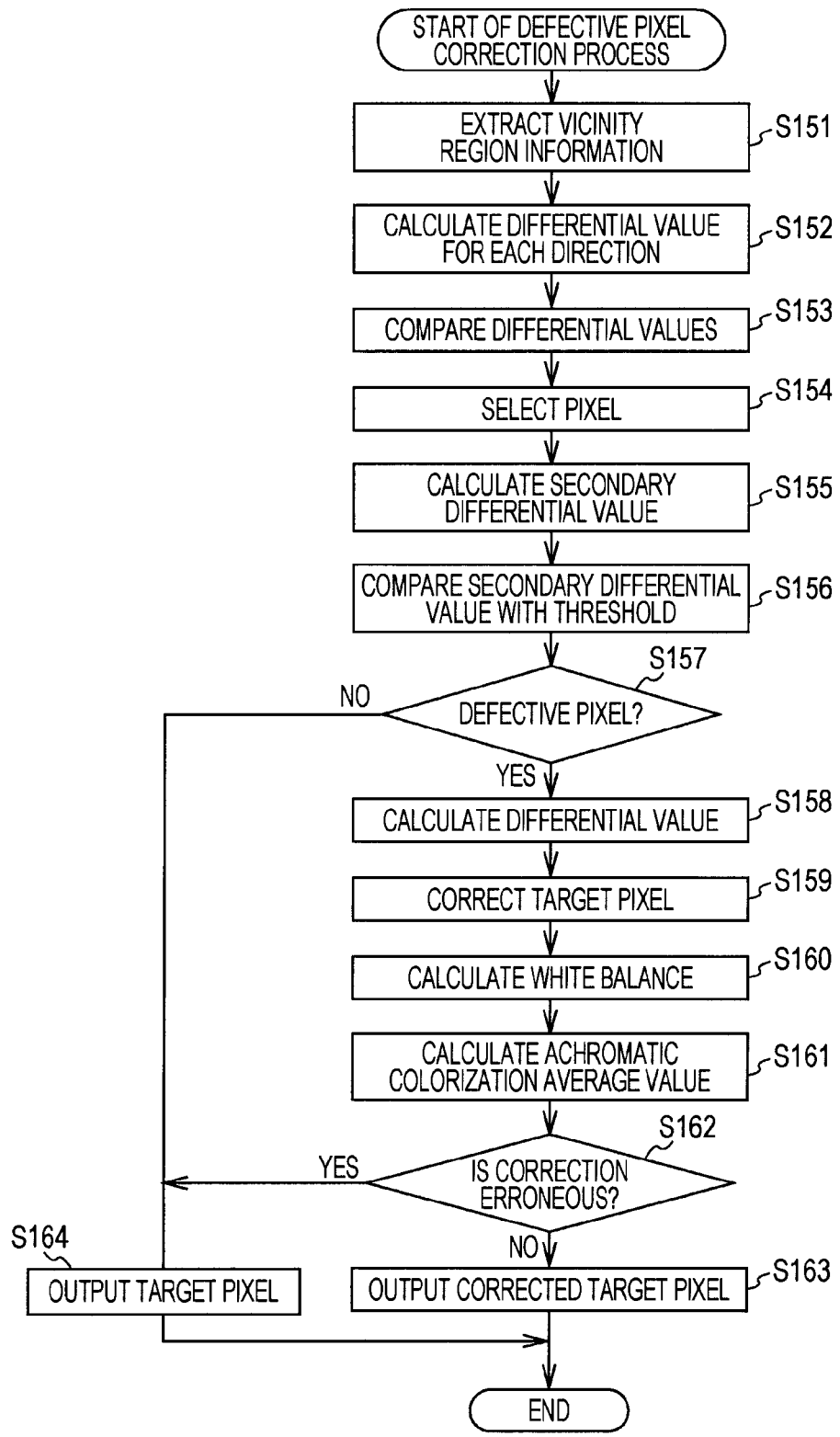
FIG. 32 is a flowchart describing a defective pixel correction device.

Next, the defect pixel correction process which is performed using the image processing device 701 will be described with reference to the flowchart of FIG. 32. The defective pixel correction process is performed for each pixel in the image which is the processing target where performing of the detection and correction of a defective pixel is to be attempted.

In step S151, the vicinity region extraction section 21 extracts the vicinity region information from the target pixel information which has been input and supplies the vicinity region information to the differential value calculation section 51 of the texture direction determination section 22, the pixel selection section 81 of the defective pixel detection section 23, and the white balance calculation section 671 of the erroneous correction determination processing section 613. For example, the vicinity region extraction section 21 extracts each of the pixels which are included in a rectangular region formed from nine pixels in the horizontal direction and nine pixels in the vertical direction which are centered on the target pixel in the image and sets the pixels as the vicinity region information.

When the vicinity region information has been extracted, after that, the processes of step S152 to step S159 are performed, but the description thereof is omitted since these processes are the same as step S12 to step S19 in FIG. 5.

Here, in step S159, when the correction value calculation section 112 corrects the target pixel based on the differential values and the selected pixels which are supplied from the differential value calculation section 111, the defect correction information which includes the corrected target pixel which is acquired by the correction is supplied to the erroneous correction determination section 673 of the erroneous correction determination processing section 613.

In addition, when the corrected target pixel has been acquired, after that, the processes of step S160 to step S164 are performed and the defective pixel correction process is complete, but the description thereof is omitted since these processes are the same as step S125 to step S129 in FIG. 25.

Here, in a case where it is determined in step S157 that the target pixel is a defective pixel or in a case where it is determined in step S162 that the correction with regard to the target pixel is erroneous correction, the process of step S164 is performed. That is, the pixel value of the original target pixel before correction is output as the pixel target of the final target pixel by the erroneous correction determination section 673.

As above, the image processing device 701 calculates the plurality of secondary differential values using several pixels including the target pixel which are lined up in the texture direction and whether or not the target pixel is a defective pixel is specified by carrying out a threshold process with the secondary differential values. In addition, the image processing device 701 determines whether the correction with the target pixel is erroneous correction by comparing the target pixel before and after correction and the achromatic colorization average value and outputs the target pixel before correction or after correction.

Due to this, it is possible for defective pixels to be more simply detected with a higher degree of accuracy and it is possible to acquire a higher quality image using the correction of defective pixels.

Fifth Embodiment

[Configuration Example of Image Processing Device]

Furthermore, above, the case where the erroneous correction with regard to the target pixel is detected has been described as an example, but the erroneous correction determination of the present technology is able to be applied also with regard to any correction process if it is a correction process with regard to a target pixel such as noise reduction (removal of noise).

Figure 33:
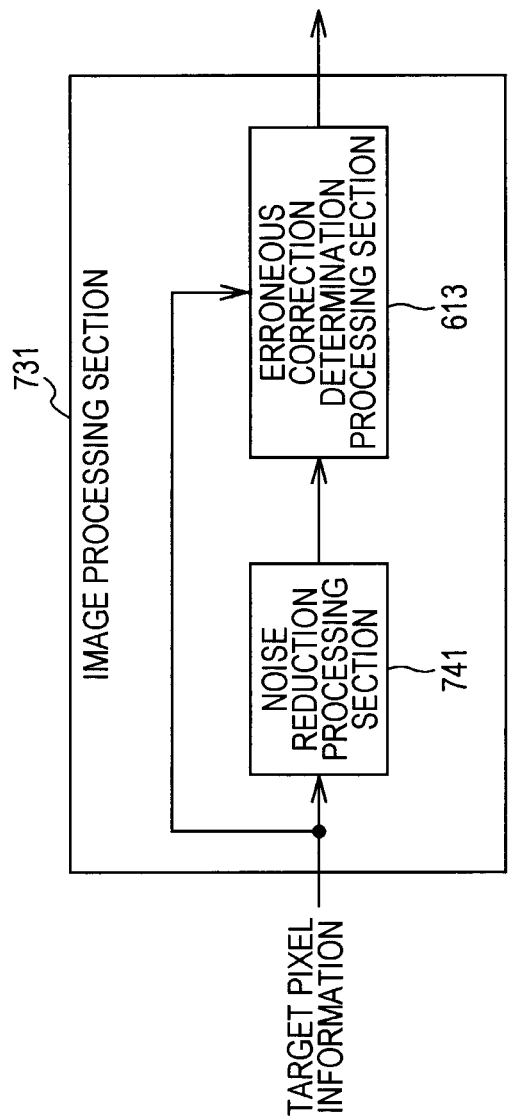
FIG. 33 is a diagram illustrating another configuration example of an image processing device.

For example, in a case where the erroneous correction determination of the present technology is applied to a noise reduction process, an image processing device which performs the noise reduction process with regard to the image is configured as shown in FIG. 33. Here, in FIG. 33, the same reference numeral is attached to the portions which correspond to the case of FIG. 22 and the description thereof is appropriately omitted.

An image processing device 731 in FIG. 33 is configured from a noise reduction processing section 741 and the erroneous correction determination processing section 613. In addition, in the image processing device 731, the target pixel information is supplied.

The noise reduction processing section 741 performs the noise reduction process with regard to the target pixel based on the target pixel information which has been supplied and correction information which has been acquired due to the noise reduction process, that is, the correction process with regard to the target pixel is supplied to the erroneous correction determination processing section 613.

For example, the noise reduction processing section 741 specifies whether the target pixel is a pixel which configures an edge based on the pixels in the vicinity of the target pixel. Then, the noise reduction processing section 741 calculates the pixel value after the noise reduction process, that is, after the correction process with regard to the target pixel based on the pixels in the vicinity of the target pixel in a case where the target pixel is not a pixel which configures an edge. Specifically, for example, the average value of the pixel values of several pixels in the vicinity of the target pixel is set as the pixel value of the target pixel after correction (referred to below as the corrected target pixel). In addition, the noise reduction processing section 741 sets the pixel value of the target pixel as the pixel value of the corrected target pixel as it is in a case where the target pixel is a pixel which configures an edge.

The noise reduction processing section 741 supplies the corrected target pixel which has been determined to the erroneous correction determination section 673 of the erroneous correction determination processing section 613 when the corrected target pixel has been determined in this manner.

The erroneous correction determination processing section 613 performs the erroneous correction determination based on the target pixel information which has been supplied and the corrected target pixel from the noise reduction processing section 741 and outputs either or the pixel value before correction or the corrected target pixel as the final target pixel according to the determination result.

At this time, the white balance calculation section 671 of the erroneous correction determination processing section 613 extracts the vicinity region information from the target pixel information which has been supplied and calculates the white balance.

As above, it is possible for the erroneous correction determination of the present technology to be applied and a higher quality image to be acquired even in a case where a correction process which is different to the defect correction such as the noise reduction process is performed with regard to the target pixel.

Here, the series of processes which have been described in the third embodiment to the fifth embodiment also is able to be executed using hardware and is able to be executed using software. For example, in a case where the series of processes described above is executed using software, a program which configures the software is executed using a computer shown in FIG. 21.

Furthermore, the present technology is able to be configured as below.

[9]

An image processing device which is provided with a correction section which corrects a target pixel based on pixels in a region which includes the target pixel in the image with regard to an image where each pixel has any of a plurality of color components as a pixel value and an erroneous correction determination section which performs erroneous correction determination with regard to the target pixel based on the pixels in a vicinity region which includes the target pixel in the image, the target pixel, and the corrected target pixel which is acquired by the correction with regard to the target pixel.

[10]

The image processing device described in [9] where the erroneous correction determination section performs the erroneous correction determination based on at least the pixels in the vicinity of the target pixel which have a color component which is different to the target pixel, the target pixel, and the corrected target pixel.

[11]

The image processing device described in [10] where there is further provided a white balance calculation section which calculates a fraction of the average value of the pixels with the same color as the target pixel in the vicinity region and the average value of the pixels with a color difference to the target pixel in the vicinity region as white balance and an achromatic colorization average value calculation section which calculates an achromatic colorization average value by multiplying the average value of pixels with a color different from the target pixel which are positioned in the vicinity of the target pixel with the white balance, where the erroneous correction determination section performs erroneous correction determination by comparing the achromatic colorization average value, the target pixel, and the corrected target pixel.

[12]

The image processing device described in [11] where the erroneous correction determination section outputs the target pixel as the final target pixel in a case where the absolute difference value of the achromatic colorization average value and the target pixel is equal to or less than the absolute difference value of the achromatic colorization average value and the corrected target pixel.

[13]

The image processing device described in [11] or [12] where the erroneous correction determination section outputs the corrected target pixel as the final target pixel in a case where the absolute difference value of the achromatic colorization average value and the target pixel is larger than the absolute difference value of the achromatic colorization average value and the corrected target pixel.

[14]

The image processing device described in any of [9] to [13] where the correction section corrects the target pixel by performing a defective pixel correction process or a noise removal process with regard to the target pixel.

The present disclosure contains subject matter related to that disclosed in Japanese Priority Patent Application JP 2011-076186 filed in the Japan Patent Office on Mar. 30, 2011 and Japanese Priority Patent Application JP 2012-002608 filed in the Japan Patent Office on Jan. 10, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
a determination section which determines a texture direction in a vicinity region based on the vicinity region which includes a target pixel in the image; and
a detection section which detects whether or not the target pixel is a defective pixel based on a plurality of pixels including the target pixel which are lined up in the texture direction in the image,
wherein the determination section calculates a differential value of a direction in the vicinity region based on a differential value between the pixels which are lined up in the same direction in the vicinity region and the direction where the differential value is the smallest out of a plurality of directions is set as the texture direction,
wherein the detection section is provided with
a secondary differential value calculation section which calculates a secondary differential value of the pixel value of the pixel with regard to a grouping of a predetermined number of pixels including the target pixel which are lined up to be continuous in the texture direction in the image and
a comparator which determines whether the target pixel is a defective pixel based on the secondary differential values of a plurality of the groupings which are different, and
wherein the determination section and the detection section are each implemented via at least one processor.

2. The image processing device according to claim 1, wherein the comparator determines that the target pixel is a defective pixel in a case where each secondary differential value of the plurality of the groupings which are different is larger than a predetermined threshold.

3. The image processing device according to claim 1, further comprising:
a defective pixel correction section which corrects the target pixel based on the pixels in the vicinity of the target pixel which are the same color as the target pixel and are lined up in the texture direction,
wherein the defective pixel correction section is implemented via at least one processor.

4. The image processing device according to claim 3, wherein the defective pixel correction section is provided with
a differential value calculation section which calculates differential values for two pixels which are adjacent in a first direction which is parallel to the texture direction with regard to the target pixel and differential values for two pixels which are adjacent in a second direction which is opposite to the first direction with regard to the target pixel, and
a correction value calculation section which sets a target pixel after correction by carrying out a weighted average for two pixels which are adjacent in a direction where the differential value is smaller out of the first direction and the second direction with regard to the target pixel.

5. An image processing method of an image processing device, which is provided with a determination section which determines texture direction in a vicinity region based on the vicinity region which includes a target pixel in the image and a detection section which detects whether or not the target pixel is a defective pixel based on a plurality of pixels including the target pixel which are lined up in the texture direction in the image, the method comprising:

determining the texture direction using the determination section; and
  detecting the defective pixel using the detection section,
  wherein the determining comprises calculating a differential value of a direction in the vicinity region based on a differential value between the pixels which are lined up in the same direction in the vicinity region and the direction where the differential value is the smallest out of a plurality of directions is set as the texture direction, and
  wherein the detecting comprises calculating a secondary differential value of the pixel value of the pixel with regard to a grouping of a predetermined number of pixels including the target pixel which are lined up to be continuous in the texture direction in the image, and determining whether the target pixel is a defective pixel based on the secondary differential values of a plurality of the groupings which are different.

6. A non-transitory computer-readable medium having embodied thereon a program, which when executed by a processor of a computer causes the processor to execute a method, the method comprising:

determining a texture direction in a vicinity region based on the vicinity region which includes a target pixel in an image; and
  detecting whether the target pixel is a defective pixel based on the plurality of pixels including the target pixel which are lined up in the texture direction in the image,
  wherein the determining comprises calculating a differential value of a direction in the vicinity region based on a differential value between the pixels which are lined up in the same direction in the vicinity region and the direction where the differential value is the smallest out of a plurality of directions is set as the texture direction, and
  wherein the detecting comprises calculating a secondary differential value of the pixel value of the pixel with regard to a grouping of a predetermined number of pixels including the target pixel which are lined up to be continuous in the texture direction in the image, and determining whether the target pixel is a defective pixel based on the secondary differential values of a plurality of the groupings which are different.

* * * * *